United States Patent
Ramachandra et al.

(10) Patent No.: US 11,481,390 B2
(45) Date of Patent: Oct. 25, 2022

(54) OPTIMIZING CURSOR LOOPS IN RELATIONAL DATABASE SYSTEMS USING CUSTOM AGGREGATES

(71) Applicant: Microsoft Technology Licensing, LLC, Redmond, WA (US)

(72) Inventors: Karthik Saligrama Ramachandra, Bangalore (IN); Surabhi Gupta, Bangalore (IN); Sanket Jayant Purandare, Boston, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 94 days.

(21) Appl. No.: 16/938,585

(22) Filed: Jul. 24, 2020

(65) Prior Publication Data

US 2022/0027367 A1    Jan. 27, 2022

(51) Int. Cl.
*G06F 16/00* (2019.01)
*G06F 16/2452* (2019.01)
(Continued)

(52) U.S. Cl.
CPC .......... *G06F 16/24522* (2019.01); *G06F 8/41* (2013.01); *G06F 8/75* (2013.01); *G06F 16/244* (2019.01)

(58) Field of Classification Search
CPC ........ G06F 16/24522; G06F 8/41; G06F 8/75; G06F 16/244
See application file for complete search history.

(56) References Cited

U.S. PATENT DOCUMENTS

2005/0177579 A1* 8/2005 Blakeley .............. G06F 16/2448
2008/0288446 A1* 11/2008 Hu ....................... G06F 16/2462
(Continued)

FOREIGN PATENT DOCUMENTS

WO  WO-2021067977 A1 * 4/2021  ....... G06F 16/24542

OTHER PUBLICATIONS

"Adempiere: Opensource ERP Software", Retrieved From: http://adempiere.net/web/guest/welcome, Retrieved Date: Jul. 2, 2020, 3 Pages.
(Continued)

*Primary Examiner* — Ashish Thomas
*Assistant Examiner* — Suman Rajaputra
(74) *Attorney, Agent, or Firm* — Fiala & Weaver P.L.L.C.

(57) ABSTRACT

Methods and systems are provided for converting a loop (e.g., a cursor loop) to a declarative Structured Query Language (SQL) query that invokes a custom aggregate function. The loop includes a select query and a loop body that includes a program fragment that can be evaluated over a result set of the select query one row at a time. The system verifies that the loop body does not modify a persistent state of the database. A custom aggregate function that expresses the loop body is automatically constructed according to a contract. An aggregate class comprising aggregation methods of the contract are used to construct the aggregate function based on results of static analysis. The select query is automatically rewritten to form a declarative SQL query that invokes the custom aggregate function. The declarative SQL query may be executed by a database management system (DBMS) SQL server.

20 Claims, 9 Drawing Sheets

(51) Int. Cl.
  *G06F 8/75* (2018.01)
  *G06F 8/41* (2018.01)
  *G06F 16/242* (2019.01)

(56) References Cited

U.S. PATENT DOCUMENTS

| | | | | |
|---|---|---|---|---|
| 2010/0169612 | A1* | 7/2010 | Persson | G06F 9/30065 |
| | | | | 712/205 |
| 2012/0078951 | A1* | 3/2012 | Hsu | G06F 16/24532 |
| | | | | 707/769 |
| 2012/0151095 | A1* | 6/2012 | Cyr | G06F 3/0622 |
| | | | | 710/5 |
| 2018/0329952 | A1* | 11/2018 | Ramachandra | G06F 16/90335 |

OTHER PUBLICATIONS

"Azure SQL Database", Retrieved from: https://azure.microsoft.com/en-us/services/sql-database/, May 28, 2019, 17 Pages.
"CLR User-Defined Aggregates Requirements", Retrieved From: https://docs.microsoft.com/en-us/sql/relational-databases/clr-integration-database-objects-user-defined-functions/clr-user-defined-aggregates-requirements?view=sql-server-ver15, Mar. 17, 2017, 4 Pages.
"CLR User-Defined Functions", Retrieved From: https://docs.microsoft.com/en-us/sql/relational-databases/clr-integration-database-objects-user-defined-functions/clr-user-defined-functions?redirectedfrom=MSDN&view=sql-server-ver15, Mar. 14, 2017, 2 Pages.
"Cursors—Curse or blessing?", Retrieved From: https://social.msdn.microsoft.com/Forums/sqlserver/en-US/c34ea336-42cd-47ab-8dbe-6a1b7c0d5783/cursors-curse-or-blessing, Nov. 5, 2006, 10 Pages.
"Java Documentation: Retrieving and Modifying Values from Result Sets", Retrieved From: https://docs.oracle.com/avase/tutorial/jdbc/basics/retrieving.html, Retrieved Date: Jul. 2, 2020, 7 Pages.
"LISTAGG: Oracle Database SQL Language Reference", Retrieved From: https://docs.oracle.com/cd/E11882_01/server.112/e41084/functions089.htm#/SQLRF30030, Retrieved Date: Jul. 2, 2020, 3 Pages.
"Microsoft SQL Server 2019", Retrieved From: https://www.microsoft.com/en-us/sql-server/sql-server-2019, 2019, 7 Pages.
"Performance Considerations of Cursors", Retrieved From: https://www.brentozar.com/sql-syntax-examples/cursor-example/, Retrieved Date: Jul. 2, 2020, 3 Pages.
"Procedural SQL on Hadoop, NoSQL and RDBMS", Retrieved From: http://www.hplsql.org/why, Retrieved Date: Jul. 2, 2020, 2 Pages.
"RUBBoS: Rice University Bulletin Board System Benchmark", Retrieved From: https://web.archive.org/web/20090526223013/http://jmob.ow2.org/rubbos.html, May 26, 2009, 2 Pages.
"RUBiS: Rice University Bidding System Benchmark", Retrieved From: https://web.archive.org/web/20090704124541/http://rubis.ow2.org/, Jul. 4, 2009, 3 Pages.
"Scalar UDF Inlining", Retrieved From: https://docs.microsoft.com/en-us/sql/relational-databases/user-defined-functions/scalar-udf-inlining?view=sql-server-ver15, Jun. 23, 2020, 12 Pages.
"The Java Database Connectivity API", Retrieved From: https://docs.oracle.com/javase/8/docs/technotes/guides/jdbc/, Retrieved Date: Jul. 2, 2020, 2 Pages.
"Transact SQL", Retrieved From: https://docs.microsoft.com/en-us/sql/t-sql/language-elements/language-elements-transact-sql?view=sql-server-ver15, Jun. 10, 2016, 1 Page.
Cheung, et al., "Automatic Partitioning of Database Applications", in Repository of https://arxiv.org/abs/1208.0271, Aug. 1, 2012, pp. 1471-1482.
Cheung, et al., "Automatically Leveraging MapReduce Frameworks for Data-Intensive Applications", in Proceedings of the 2018 International Conference on Management of Data, Jun. 10, 2018, pp. 1205-1220.
Cheung, et al., "Optimizing Database-Backed Applications with Query Synthesis", in Journal of ACM SIGPLAN Notices, vol. 48, Issue 6, Jun. 16, 2013, pp. 3-14.
Cohen, Sara, "User-defined Aggregate Functions: Bridging Theory and Practice", in Proceedings of the 2006 ACM SIGMOD International Conference on Management of Data, Jun. 27, 2006, pp. 49-60.
Emani, et al., "COBRA: A Framework for Cost-Based Rewriting of Database Applications", in 2018 IEEE 34th International Conference on Data Engineering, Feb. 26, 2018, 14 Pages.
Ferrante, et al., "The Program Dependence Graph and its use in Optimization", in Proceedings of ACM Transactions on Programming Languages and Systems, vol. 9, Issue 3, Jul. 1, 1987, 31 Pages.
Galindo-Legaria, et al., "Orthogonal Optimization of Subqueries and Aggregation", in Proceedings of the ACM SIGMOD International Conference on Management of Data, May 21, 2001, pp. 571-581.
Gupta, et al., "Aggify: Lifting the Curse of Cursor Loops using Custom Aggregates", in Proceedings of the 2020 ACM SIGMOD International Conference on Management of Data, Jun. 14, 2020, pp. 559-573.
Guravannavar, et al., "Rewriting Procedures for Batched Bindings", in Proceedings of the VLDB Endowment, Aug. 23, 2008, pp. 1107-1123.
Hirn, et al., "Compiling PL/SQL Away", in Repository of https://arxiv.org/abs/1909.03291, Sep. 7, 2019, 6 Pages.
Kennedy, et al., "Optimizing Compilers for Modern Architectures: A Dependence-Based Approach", in Book of Optimizing compilers for Modem Architectures Dependence-Based Approach, Apr. 2002, 1 Page.
Khedker, et al., "Data Flow Analysis: Theory and Practice", in Book of Data Flow Analysis Theory and Practice, 2009, 394 Pages.
Lieuwen, et al., "A Transformation-Based Approach to Optimizing Loops in Database Programming Languages", in Proceedings of the 1992 ACM SIGMOD International Conference on Management of Data, Jun. 1992, pp. 91-100.
Muchnick, S.S., "Advanced Compiler Design and Implementation", Published by Morgan Kaufmann Publishers Inc., 1997, 16 Pages.
Park, et al., "Iterative Query Processing Based on Unified Optimization Techniques", in Proceedings of the 2019 International Conference on Management of Data, Jun. 30, 2019, pp. 54-68.
Purandare, et al., "Technical Report: Optimizing Cursor Loops in Relational Databases", in Repository of https://arxiv.org/pdf/2004.05378.pdf, May 5, 2020, 17 Pages.
Radoi, et al., "Translating Imperative Code to MapReduce", in Proceedings of the 2014 ACM International Conference on Object Oriented Programming Systems, Oct. 20, 2014, pp. 909-927.
Emani, et al., "Extracting Equivalent SQL from Imperative Code in Database Applications", in Proceedings of the 2016 International Conference on Management of Data, Jun. 26, 2016, pp. 1781-1796.
Ramachandra, et al., "Froid: Optimization of Imperative Programs in a Relational Database", in Proceedings of the Very Large Database Endowment, vol. 11, Issue 4, Dec. 2017, pp. 432-444.
Roberts, Rick, "The Curse of the Cursors: Why You Don't Need Cursors in Code Development", Retrieved From: https://www.datavail.com/blog/curse-of-the-cursors-in-code-development, Apr. 13, 2015, 6 Pages.
Schulz, Brad, "The Truth About Cursors", Retrieved From: http://bradsruminations.blogspot.com/2010/05/truth-about-cursors-part-1.html, May 16, 2010, 19 Pages.
Aho, et al., "Compilers: Principles, Techniques and Tools", in Book of Compilers: Principles, Techniques, and Tools, Second Edition, Published by Addison-Wesley, 2006, pp. 1038.
Simhadri, et al., "Decorrelation of user Defined Function Invocations in Queries", in Proceedings of IEEE 30th International Conference on Data Engineering, Mar. 31, 2014, 12 Pages.
Surabhi, "Aggify Evaluation Workloads", Retrieved From: https://github.com/surabhi236/Aggify_workloads, Retrieved Date: Jul. 2, 2020, 1 Page.
Yan, et al., "Eager Aggregation and Lazy Aggregation", in Proceedings of the 21th International Conference on Very Large Data Bases, Sep. 1995, 13 Pages.

(56) References Cited

OTHER PUBLICATIONS

Floratos, et al., "SQLoop: High Performance Iterative Processing in Data Management", in Proceedings of the 38th IEEE International Conference on Distributed Computing Systems, Jul. 2, 2018, pp. 1039-1051.

* cited by examiner

OPTIMIZING CURSOR LOOPS IN RELATIONAL DATABASE SYSTEMS USING CUSTOM AGGREGATES

BACKGROUND

Loops that iterate over structured query language (SQL) query results are quite commonly used in application programs that run outside a database management system (DBMS), as well as in user defined functions (UDFs) and stored procedures that run within the DBMS. It can be argued that set-oriented operations are more efficient and should be preferred over iteration, but based on real world use cases, it is clear that loops over query results are inevitable in many situations, and are preferred by many users. Such loops, known as cursor loops, come with significant trade-offs and overhead with respect to performance, resource consumption, and concurrency.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and systems are provided for converting a loop to a declarative SQL query that invokes a custom aggregate function. The system comprises one or more processors and one or more memory devices that store program code to be executed by the one or more processors. The program code comprises a precondition verifier configured to receive the loop for execution. The loop comprises a select query and a loop body including a program fragment that can be evaluated over a result set of the select query one row at a time. The precondition verifier is configured to verify that the loop body does not modify a persistent state of the database. A custom aggregate function constructor is configured to automatically construct the custom aggregate function according to a contract. The custom aggregate function expresses the loop body. A query rewrite engine is configured to automatically rewrite the select query to the declarative SQL query that invokes the custom aggregate function.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
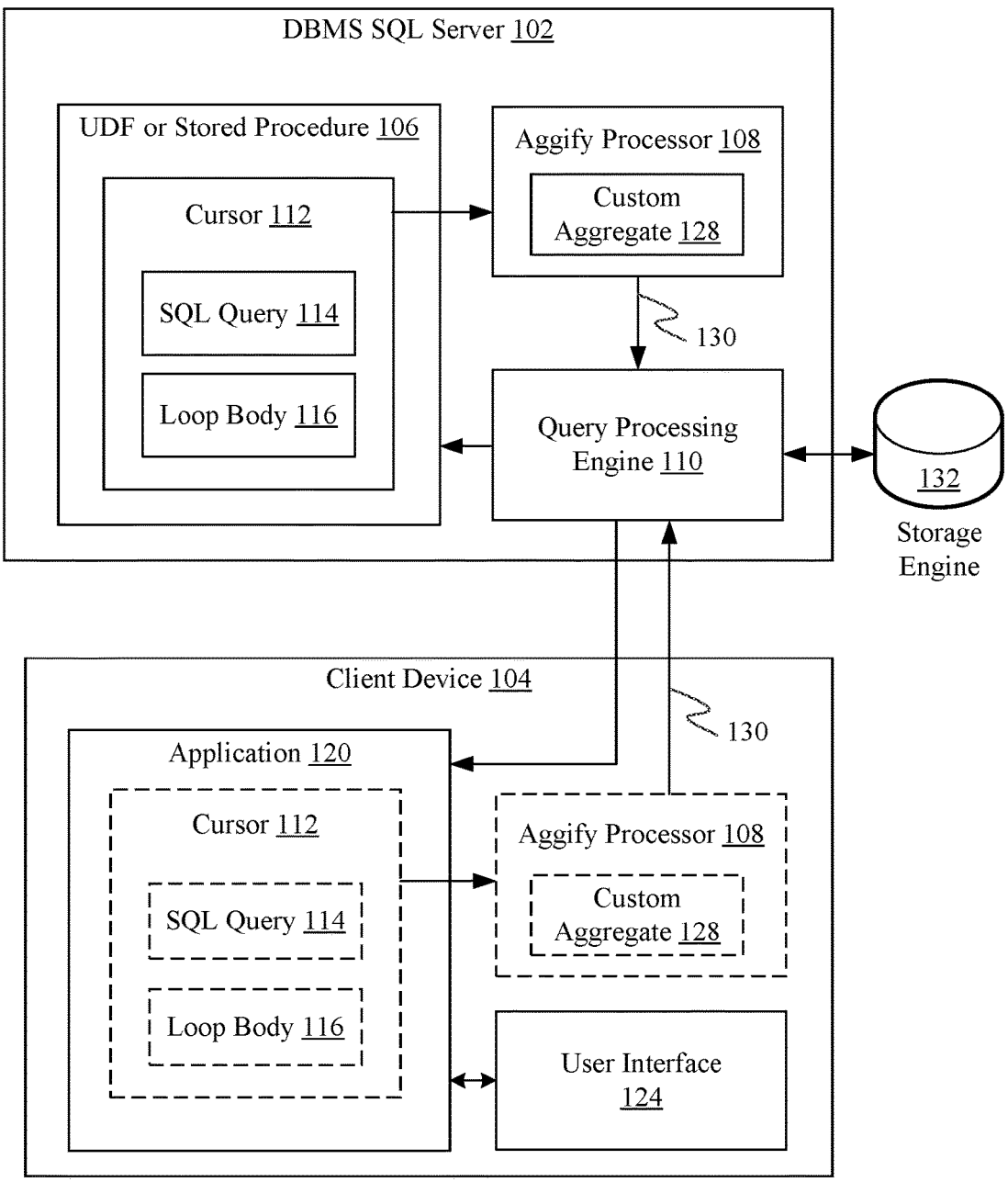
FIG. 1 is a block diagram of a system configured to convert a loop that iterates over SQL query results to a declarative SQL query that invokes a custom aggregate function, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments.
1. Overview

As described above, loops that iterate over SQL query results, such as cursor loops, are often used in UDFs and stored procedures that run within a DBMS and in applications that run outside the DBMS. While developers often prefer composing the cursor loops, set-oriented operations are known to be more efficient than iteration. Execution of cursor loops may lead to performance degradation. For example, static cursors materialize a query result set on disk, which causes significant input/output (I/O) overhead. Also, cursor execution utilizes interpreted SQL code, which executes one statement at a time and slows down the execution. Moreover, in instances where the cursor loop is executed in an application remote from the DBMS SQL server, and the code interacts with the server over a network (e.g., in a Java application that uses JDBC API), cursor usage results in movement of large amounts of data across the network, adding significant overhead to the execution.

A technique referred to as Aggify is disclosed herein for improving processing performance, resource consumption, and concurrency when processing the results of a query received by a DBMS. The Aggify technique achieves these improvements by automatically generating custom aggregates that are equivalent in semantics to the original loop. The original loop may be a cursor loop that includes a while loop, or a FOR loop. The Aggify technique removes the original loop by rewriting the query to use the generated aggregate. This technique has several advantages such as: (i) pipelining of the entire cursor loop operations instead of using materialization, (ii) pushing down loop computation from the application layer into the DBMS (e.g., closer to the data), and (iii) leveraging existing work on optimization of aggregate functions, resulting in efficient query plans. The Aggify technique is described with the use of benchmark examples. The Aggify technique provides a method for converting a cursor loop by automatically generating a custom aggregate function based on a loop body of the cursor loop, and automatically rewriting a select query of the cursor as a declarative SQL query that calls the custom aggregate function.

Since their inception, relational database management systems have emphasized the use of set-oriented operations over iterative, row-by-row operations. SQL strongly encourages the use of set operations and can evaluate such operations efficiently, whereas row-by-row operations are generally known to be inefficient.

However, implementing complex algorithms and business logic in SQL requires decomposing a problem in terms of set-oriented operations. From an application developers' standpoint, this can be fairly difficult in many situations. On the other hand, using simple row-by-row operations is often much more intuitive and easier for most developers to compose. As a result, code that iterates over query results and performs operations for every row is very common in database applications.

FIG. 1 is a block diagram of a system 100 configured to convert a loop that iterates over SQL query results to a declarative SQL query that invokes a custom aggregate function, according to an example embodiment. As shown in FIG. 1, system 100 includes a database management system (DBMS) SQL server 102, declarative SQL query with custom aggregate invocation 130, and a storage engine 132. DBMS SQL server 102 comprises a query processing engine 110.

System 100 may be configured in various ways. In some embodiments, DBMS SQL server 102 includes Aggify processor 108. DBMS SQL server 102 may also include a UDF or stored procedure 106. UDF or stored procedure 106 includes a cursor 112. Cursor 112 includes an SQL query 114 and a loop body 116.

In some embodiments, system 100 may include client device 104. In some embodiments, client device 104 includes Aggify processor 108. Client device 104 may also include an application 120 and a user interface 124. Application 120 may include cursor 112 with SQL query 114 and loop body 116.

DBMS SQL server 102 may be communicatively coupled to client device 104 and storage engine 132. DBMS SQL server 102 and client device 104 may each comprise any suitable computing device, such as a stationary computing device (e.g., a desktop computer or personal computer), a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), a gaming console/system (e.g., Microsoft Xbox®, Sony PlayStation®, Nintendo Wii® or Switch®, etc.), an appliance, a set top box, etc.

Loop body 116 may include a program fragment that can be evaluated over a result set of SQL query 114, one row at a time.

UDF or stored procedure 106 may be a UDF or a stored procedure in DBMS SQL server 102. For example, stored procedure 106 may comprise a group of SQL statements compiled into a single execution plan and may be configured to retrieve data, modify data, and/or delete data of a storage device via storage engine 132. UDF 106 may be configured to write SQL queries, and it may accept parameters and return a result as an output. In some embodiments, UDF or stored procedure 106 includes cursor 112. UDF or stored procedure 106 may be configured to transmit cursor 112 including SQL query 114 and loop body 116 to Aggify processor 108 to interact with in a storage device via query processing engine 110 and storage engine 132.

In some embodiments, application 120 may be a database-backed application in client device 104. Application 120 may be configured to transmit cursor 112 including SQL query 114 and loop body 116 to Aggify processor 108 to interact with stored data via query processing engine 110 and storage engine 132. In some embodiments, application 120 may receive user input via user interface 124 that triggers processing of cursor 112, SQL query 114, and loop body 116.

Aggify processor 108 is configured to receive cursor 112 including SQL query 114 and loop body 116 and convert the same to declarative SQL query with custom aggregate invocation 130. For example, Aggify processor 108 is configured to automatically construct custom aggregate function 128, which is equivalent or substantially the same in semantics to loop body 116 of cursor 112. Custom aggregate function 128 may be constructed according to an aggregation contract. Aggify processor 108 may rewrite SQL query 114 to invoke the constructed custom aggregate function 128, to generate declarative SQL query with custom aggregate invocation 130. Aggify processor 108 is further configured to forward declarative SQL query with custom aggregate invocation 130 to query processing engine 110. In some embodiments, Aggify processor 108 may be instantiated in DBMS SQL server 102 and receive cursor 112 including SQL query 114 and loop body 116 from UDF or stored procedure 106. In some embodiments, Aggify processor 108 may be instantiated in client device 104 and receive cursor 112 including SQL query 114 and loop body 116 from application 120. Moreover, in some embodiments, Aggify processor 108 may be instantiated in DBMS SQL server 102 and receive cursor 112 including SQL query 114 and loop body 116 from application 120 in client device 104.

Query processing engine 110 is configured to receive declarative SQL query with custom aggregate invocation 130 from Aggify processor 108, process the declarative SQL query 130, retrieve data from storage engine 132, and process the results. Query processing engine 110 may be configured to transform declarative SQL query with custom aggregate invocation 130 from SQL into a low-level language execution strategy for implementing relational algebra. Query processing engine 110 may be configured to execute the strategy to obtain data that was requested in cursor 112 (including SQL query 114 and loop body 116) via storage engine 132. Query processing engine 110 is further configured to return the requested data to the component that originated cursor 112 (e.g., UDF or stored procedure 106, or application 120).

Storage engine 132 may comprise a software module configured to manage data in one or more storage devices, for example, to create, read, update, and/or delete data stored in memory structures of one or more storage devices. For example, storage engine 132 may be configured to read the stored data in response to a request from query processing engine 110 as a result of the processing of declarative SQL query with custom aggregate invocation 130. Storage engine 132 may be further configured to transmit the read data to query processing engine 110.

Cursor 112 may comprise a construct including SQL query 114 and loop body 116 that includes code configured to iterate over query results and perform operations for every row of the result set. In this regard, the ANSI SQL standard has specified a specialized CURSOR construct used to enable iteration over query results and many database vendors support CURSORs. Cursors have been added to procedural extensions of big data query processing systems such as Spark SQL, Hive®, and other SQL-on-Hadoop systems. Cursors could either be in the form of SQL cursors that can be used in UDFs, stored procedures, etc. (e.g., UDF or stored procedure 106), as well as application programming interfaces (API) such as Java database connectivity (JDBC) that can be used in application programs (e.g., application 120). While cursors can be quite useful for developers, they come with significant performance trade-offs. Primarily, cursors process rows one-at-a-time, and as a result, may negatively affect system performance. Depending upon the cardinality of query results on which cursors are defined, cursors may materialize results on disk, and as a result, introduce additional I/O activity and storage space requirements. Cursors may not only suffer from processing speed problems or extended latency, but can also acquire locks on data for a longer time than necessary, thereby greatly decreasing concurrency and throughput. This trade-off between a software developer's preferred coding method and system performance has been referred to by many as "the curse of cursors," and users are often advised by experts about the pitfalls of using cursors. A similar trade-off exists in submitting a SQL query to fetch data from a remote database and iterating over these query results by performing row-by-row operations. More generally, imperative programs are known to have significant performance problems when they are executed either in a DBMS or in database-backed applications on a client device.

Techniques implemented in Aggify processor 108 to generate declarative SQL query with custom aggregate invocation 130 provide substantial performance improvements relative to cursor loops iterating over query results. For such cursor loops, the Aggify technique automatically generates a custom aggregate that may be semantically equivalent or substantially the same as the original cursor loop (e.g., loop body 116), and automatically rewrites the cursor query (SQL query 114) to use this new custom aggregate, thereby removing the original cursor loop from the query process.

This rewritten form (e.g., declarative SQL query with custom aggregate invocation 130) offers several performance benefits over the original cursor 112 program. For example, it avoids materialization of the cursor query results. Instead, the entire loop may comprise a single pipelined query execution. With this form, optimization methods of aggregate functions may be leveraged and result in efficient query plans. In the context of cursor loops in applications that run outside the DBMS (e.g., application 120 in client device 104), the techniques of Aggify processor 108 can significantly reduce the amount of data transferred between DBMS SQL server 102 and client device 104. Further, the entire cursor loop computation which would have originally run on client device 104 may now be run inside DBMS SQL server 102, closer to the data read by storage engine 132. Finally, these benefits are achieved without having to perform intrusive changes to user code. As a result, Aggify processing is a convenient and practical approach with many system performance benefits.

The technique implemented by Aggify processor 108 can be seamlessly integrated with techniques developed in the areas of database-backed application and UDF optimization to advance the state of the art in both of these closely related areas. Key contributions of the present disclosure include:

(1) The Aggify technique is a language-agnostic technique designed to improve loops that iterate over the results of a SQL query. These loops could be present in applications that run outside a DBMS or in UDFs or stored procedures that execute inside a DBMS server.

(2) The class of loops that can be optimized by the Aggify technique is formally characterized. In particular, the Aggify technique is applicable to all cursor loops present in SQL UDFs. The output of the Aggify technique maybe semantically equivalent to the input cursor loop.

(3) Enhancements to the core Aggify technique expand the scope of the Aggify technique beyond cursor loops to handle iterative FOR loops. The Aggify technique also works in conjunction with existing techniques in this space.

(4) The Aggify technique has been prototyped on SQL Servers achieving performance gains, resource savings, and reductions in data movement.

Two motivating examples follow below including an example of a cursor loop within a UDF and a cursor loop in a database-backed application.

2. Motivation

Two motivating examples are provided below, and a method for evaluating cursor loops is briefly described.

2.1 Example: A cursor Loop within a UDF

As an example of a cursor 112, consider a query on the TPC-H schema that is based on query 2 of the TPC-H benchmark, but with a slight modification. In general, given a part key, this query finds the supplier name that supplies this part at the lowest cost. For each part in the PARTS table, this query lists the part identifier (p_partkey) and the name of the supplier that supplies that part with the minimum cost. To this query, an additional requirement is introduced such that a user should be able to set a lower bound on the supply cost if required. This lower bound is optional, and if unspecified, should default to a pre-specified value.

Typically, TPC-H query 2 is implemented using a nested subquery. However, another way to implement this is by means of a simple UDF that, given a parameter p_partkey, returns the name of the supplier that supplies that part with the minimum cost. Code Example 1 below illustrates such a query and UDF (expressed in the T-SQL dialect).

Code Example 1

```
--Query:
SELECT p_partkey, minCostSupp(p_partkey) FROM PART
-- UDF definition:
create function minCostSupp(@pkey int, @lb int =-1)
        returns char(25) as
        begin
1           declare @pCost decimal(15,2);
2           declare @minCost decimal(15,2) = 100000;
3           declare @sName char(25), @suppName char(25);
4           if(@lb = -1)
5              set @lb = getLowerBound(@pkey);
6           declare c1 cursor for
            (SELECT ps_supplycost, s_name
                  FROM PARTSUPP, SUPPLIER
                  WHERE ps_partkey = @pkey
                     AND ps_suppkey = s_suppkey);
7           fetch next from c1 into @pCost, @sName;
8           while (@@FETCH_STATUS = 0)
9              if (@pCost < @minCost and @pCost > @lb)
10                 set @minCost = @pCost;
11                 set @suppName = @sName;
12             fetch next from c1 into @pCost, @sName;
            end
13          return @suppName;
        end
```

Referring to Code Example 1 above, there are several benefits to implementing this query as a UDF, for example, reusability, modularity, and readability. For these reasons, developers who are not SQL experts often prefer this implementation.

The UDF minCostSupp creates a cursor (e.g., in line 6) over a query that performs a join between PARTSUPP and SUPPLIER based on the p_partkey attribute. Then, it iterates over the query results while computing the current minimum cost (while ensuring that it is above the lower bound) and maintains the name of the supplier who supplies this part at the current minimum (lines 8-12). At the end of the loop, the @suppName variable will hold the name of the minimum cost supplier subject to the lower bound constraint, which is then returned from the UDF. Note that for brevity, the OPEN, CLOSE, and DEALLOCATE statements have been omitted for the cursor in Code Example 1.

This loop is essentially computing a function that can be likened to argmin, which is not a built-in aggregate. This Code Example 1 illustrates the fact that cursor loops can contain arbitrary operations that may not always be expressible using built-in aggregates. For the specific cases of functions such as argmin, there are advanced SQL techniques that could be used; however, a cursor loop is the preferred choice for developers who are not SQL experts.

2.2 Example: A Cursor Loop in a Database-Backed Application

As another example of cursor 112, consider an application that manages investment portfolios for users. Code Example 2 (below) shows a Java method from a database backed application that uses a JDBC API to access a remote database.

Code Example 2

```
double computeCumulativeReturn(int id, Date from) {
    double cumulativeROI = 1.0;
    Statement stmt = conn.prepareStatement(
        "SELECT roi FROM monthly_investments
         WHERE investor_id = ? and start_date = ?");
    stmt.setInt(1, id);
    stmt.setDate(2, from);
    ResultSet rs = stmt.executeQuery( );
    while(rs.next( )){
        double monthlyROI = rs.getDouble("roi");
        cumulativeROI =cumulativeROI*(monthlyROI + 1);
    }
    cumulativeROI = cumulativeROI - 1;
    rs.close( ); stmt.close( ); conn.close( );
    return cumulativeROI;
```

Referring to Code Example 2, the table monthly_investments includes, among other details, the rate of return on investment (ROI) on a monthly basis. The program first issues a query to retrieve all the monthly ROI values for a particular investor starting from a specified date. Then, it iterates over these monthly ROI values and computes the cumulative rate of return on investment using a time-weighted method and returns the cumulative ROI value. When the rate of return is calculated over a series of sub-periods of time, the return in each sub-period is based on the investment value at the beginning of the sub-period. Assuming returns are reinvested, if the rates over n successive time sub-periods are r1, r2, r3, . . . , rn, then the cumulative return rate using the time-weighted method is given by [ ]: (1+r1) (1+r2) . . . (1+rn)−1. Observe that this operation is also not expressible using built-in aggregates.

2.3 Cursor Loop Evaluation

A cursor is a control structure that enables traversal over the results of a SQL query. They are similar to iterators in programming languages. DBMSs support different types of cursors such as implicit, explicit, static, dynamic, scrollable, forward-only etc. Static, explicit cursors, are arguably the most widely used and are considered herein. Cursor loops are usually evaluated as follows. As part of the evaluation of a cursor declaration (e.g., the DECLARE CURSOR statement), a DBMS executes the query and materializes the results into a temporary table. The FETCH NEXT statement moves the cursor and assigns values from the current tuple into local variables. The global variable FETCH_STATUS indicates whether there are more tuples remaining in the cursor. The body of the WHILE loop is interpreted statement-by-statement, until FETCH_STATUS indicates that the end of the result set has been reached. Subsequently, the cursor is closed and deallocated in order to clear any temporary work tables created by the cursor.

Cursor loops may lead to performance issues due to the materialization of the results of the cursor query onto disk, which incurs additional I/O and the interpreted evaluation of the loop. This is exacerbated in the presence of large datasets and more so, when invoked repeatedly as in Code Example 1. The UDF of Code Example 1 is invoked once per part, which means that the cursor query is run multiple times, and temp tables are created and dropped for every run. This excessive use of time and system resources is the reason cursors have been referred to as a "curse."

In embodiments, system 100 may operate in various ways to perform its functions.

Figure 2:
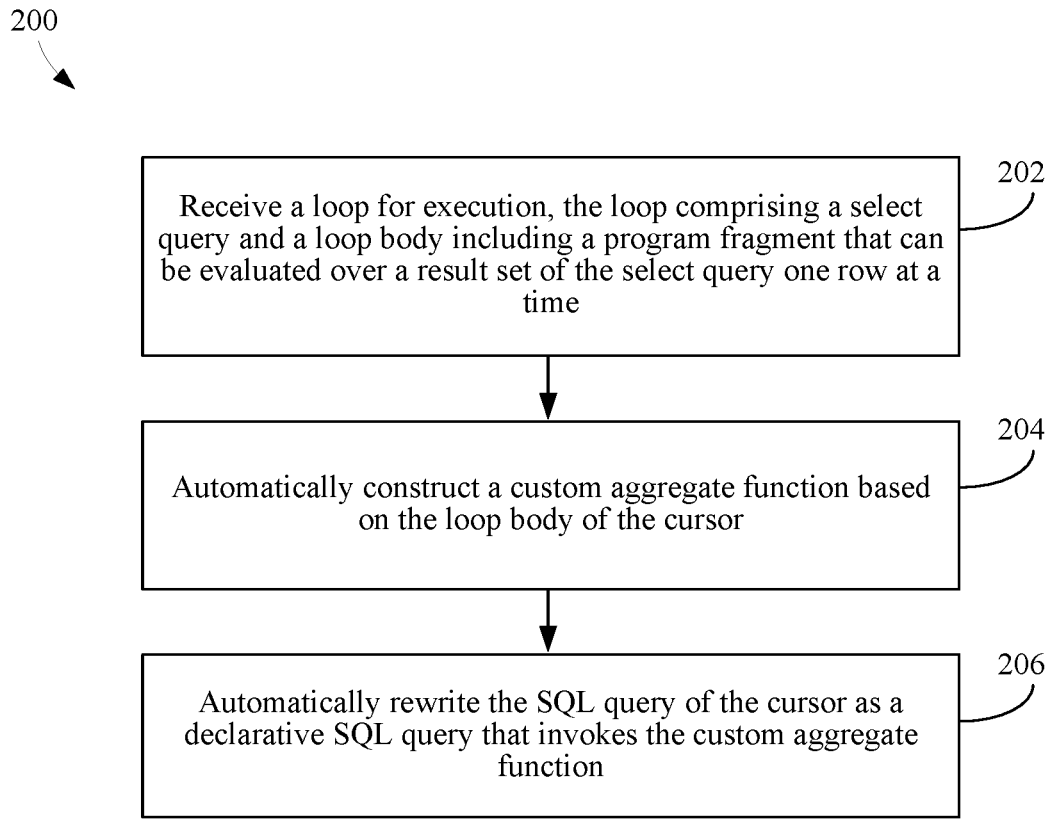
FIG. 2 is a flowchart of a method for converting a loop that iterates over SQL query results to a declarative SQL query that invokes a custom aggregate function, according to an example embodiment.

For example, FIG. 2 is a flowchart 200 of a method for converting a loop that iterates over SQL query results to a declarative SQL query that invokes a custom aggregate function, according to an example embodiment.

Flowchart 200 may be performed by DBMS SQL server 102 or client device 104. For the purpose of illustration, flowchart 200 of FIG. 2 is described with reference to FIG. 1.

Flowchart 200 of FIG. 2 begins with step 202. In step 202, a loop is received for execution, the loop comprising a select query and a loop body including a program fragment that can be evaluated over a result set of the select query one row at a time. For example, Aggify processor 108 may receive cursor 112 (e.g., a cursor loop) including SQL query 114 and loop body 116. Loop body 116 may include a program fragment that can be evaluated over a result set of the SQL query 114, one row at a time. In some embodiments, Aggify processor 108 is instantiated in DBMS SQL server 102 and receives cursor 112 from UDF or stored procedure 106 in DBMS SQL server 102. In some embodiments, Aggify processor 108 is instantiated in client device 104 and receives cursor 112 from application 120 in client device 104. Moreover, in some embodiments, Aggify processor 108 is instantiated in DBMS SQL server 102 and receives cursor 112 from application 120 in client device 104.

In step 204, the custom aggregate function is automatically constructed according to a contract, the custom aggregate function expressing the loop body. For example, Aggify processor 108 automatically constructs custom aggregate function 128 according to an aggregation contract. Custom aggregate function 128 may be semantically equivalent to or substantially the same as the loop body 116 of cursor 112.

In step 206, the SQL query of the cursor is automatically rewritten as a declarative SQL query that invokes the custom aggregate function. For example, Aggify processor 108 automatically rewrites SQL query 114 of cursor 112 as declarative SQL query with custom aggregate invocation 130 that invokes the constructed custom aggregate function 128. Thus, cursor 112 is removed from the query process and is replaced by declarative SQL query with custom aggregate invocation 130.

Processing declarative SQL query with custom aggregate invocation 130 by query processing engine 110 provides several performance benefits over processing cursor 112 directly. For example, this approach avoids materialization of intermediate cursor 112 query results because the entire loop of declarative SQL query with custom aggregate invocation 130 is processed as a single pipelined query execution. Thus, data lock times are reduced to improve processing concurrency and throughput. Moreover, this approach significantly reduces the amount of data transferred between DBMS SQL server 102 and a client device 104. For example, in instances where the entire cursor 112 computation would have been run from client device 104, declarative SQL query with custom aggregate invocation 130 may now be run inside DBMS SQL server 102. This method yields the performance benefits provided by processing the query closer to the data being read by storage engine 132 by removing network traffic latency and resource usage incurred in repeated communication between client device 104 and DBMS SQL server device 102 caused by the cursor 112 method. Finally, all these benefits are achieved without having to perform intrusive changes to user code. As a result, Aggify processing provides a convenient and practical approach with many system performance benefits. As a result, query results may be provided more quickly to applications and/or users. For example, results of a query initiated by a user via user interface 124, may be returned and displayed to the user via user interface 124 faster with Aggify processing than with cursor 112 processing.

Figure 3:
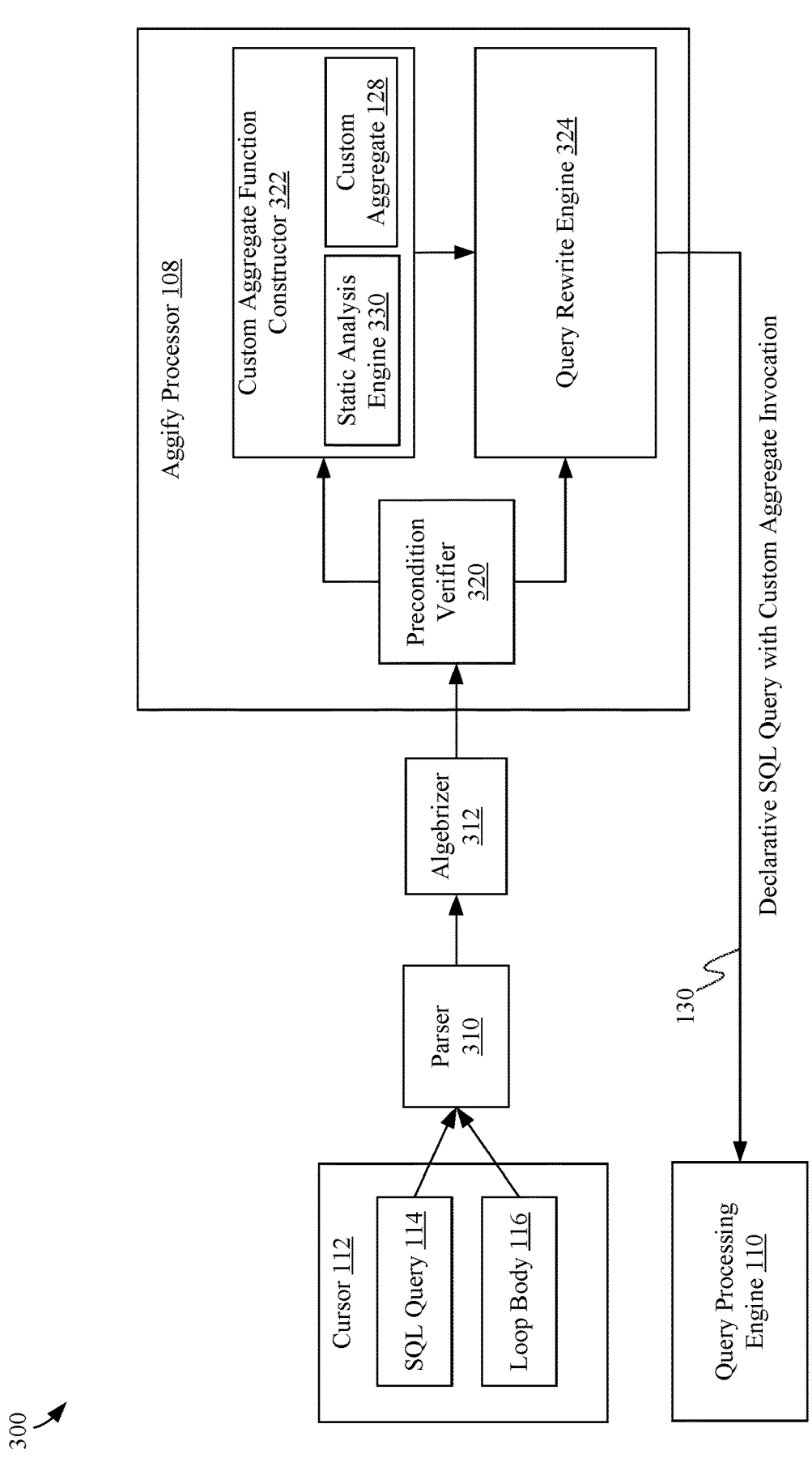
FIG. 3 is a block diagram of a system configured to convert a query loop by automatically generating a custom aggregate function based on the query loop, and automatically rewriting the query loop as a declarative SQL query that calls the custom aggregate function, according to an example embodiment.

Embodiments of systems that convert loops in relational database systems using custom aggregates may be implemented in various ways. For instance, FIG. 3 is a block diagram of a system 300 configured to convert a query loop by automatically generating a custom aggregate function based on the query loop, and automatically rewriting the query loop as a declarative SQL query that calls the custom aggregate function, according to an example embodiment.

System 300 includes Aggify processor 108, query processing engine 110, cursor 112, SQL query 114, loop body 116, declarative SQL query with custom aggregate invocation 130, a parser 310, an algebrizer 312, a precondition verifier 320, a custom aggregate function constructor 322, and a query rewrite engine 324. Custom aggregate function constructor 322 includes a static analysis engine 330, and custom aggregate function 128.

Parser 310 may be configured to receive and perform syntax checks on SQL query 114 and loop body 116 of cursor 112. As a result, parser 310 is configured to output a parsed tree based on the SQL query 114 and loop body 116 to algebrizer 312.

Algebrizer 312 is configured to receive the parsed tree as input for binding. Algebrizer 313 is configured to performs semantic checks to determine whether statements of SQL query 114 and loop body 116 are meaningful (e.g., whether objects and columns in the statements exist). Algebrizer 312 may be configured to identify data types which are being processed for the query. Algebrizer 312 may output a query processor tree to precondition verifier 320.

Precondition verifier 320 is configured to receive the output from algebrizer 312 and verify that the SQL query 114 and loop body 116 of cursor 112 includes supported operations. For example, operations that may change the persistent state of a database (e.g., data manipulation language (DML) statements against persistent tables, transactions, configuration changes etc.) may not be supported in the Aggify processor 108. Supported operations are described in more detail below in Section 4.2.

Custom aggregate function constructor 322 may be configured to automatically construct custom aggregate function 128 according to an aggregation contract, where custom aggregate function 128 expresses loop body 116. Custom aggregate function constructor 322 is configured to automatically construct custom aggregate function 128 according to methods of the contract. The methods may include an Init method, an Accumulate method, a Terminate method, and a Merge method, where the Merge method is optional.

Static analysis engine 330 is configured to perform static analysis on loop body 116. Custom aggregate function constructor 322 may be configured to utilize the results of the static analysis to automatically construct an aggregate class of custom aggregate function 128, where the aggregate class includes the methods of the contract. Custom aggregate function constructor 322 is also configured to generate code fragments for the methods in the aggregate class, and generate code fragments of fields of the aggregate class.

Custom aggregate function constructor 322 is configured to automatically construct the aggregate class including the methods of the contract by determining fields of the aggregate class, a body of the Init method, parameters of the Accumulate method, a body of the Accumulate method, and a body and return type of the Terminate method. Construction of aggregate function 128 is described in more detail below.

3. Features 3.1 Custom Aggregate Functions

An aggregate, such as custom aggregate function 128, is a function that accepts a collection of values as input and computes a single value by combining the inputs. Some common operations like min, max, sum, avg and count may be provided by DBMS SQL server 102 as built-in aggregate functions. These built-in aggregate functions are often used along with the GROUP BY operator that supplies a grouped set of values as input. In general, aggregates can be deterministic or non-deterministic. Deterministic aggregates return the same output when called with the same input set, irrespective of the order of the inputs. All the above-mentioned built-in aggregates are deterministic. Oracle's LISTAGG( ) is an example of a non-deterministic built-in aggregate function.

DBMSs may allow users to define custom aggregates (also referred to as user-defined aggregates) to implement custom logic. Custom aggregate function constructor 322 automatically defines such custom aggregate functions. Once defined, they can be used like built-in aggregate functions. These custom aggregates (e.g., custom aggregate function 128) should adhere to an aggregation contract that may include the four methods described above: Inn, Accumulate, Terminate, and Merge (where Merge is optional). The names of these methods may vary across DBMSs. The aggregation contract may be described as follows:

(1) Inn: Initializes fields that maintain the internal state of the aggregate. Init is invoked once per group.
(2) Accumulate: Defines the main aggregation logic. It is called once for each qualifying tuple in the group being aggregated. It updates the internal state of the aggregate to reflect the effect of the incoming tuple.
(3) Terminate: Returns the final aggregated value. It might optionally perform some computation as well.
(4) Merge: This method is optional; it is used in parallel execution of the aggregate to combine partially computed results from different invocations of Accumulate.

If the query that invokes the aggregate function does not use parallelism, the Merge method would not be invoked. The other 3 methods may be mandatory. The aggregation contract may not enforce any constraint on the order of the input. If order is required, it should be enforced outside of this contract.

Optimizations on aggregate functions may involve moving the aggregate around joins and allowing them to be either evaluated early or be delayed depending on cost based decisions. Duplicate insensitivity and null invariance can also be exploited to optimize aggregates.

3.2 Data Flow Analysis

The data structures and static analysis techniques of the present disclosure are briefly described below.

Figure 4:
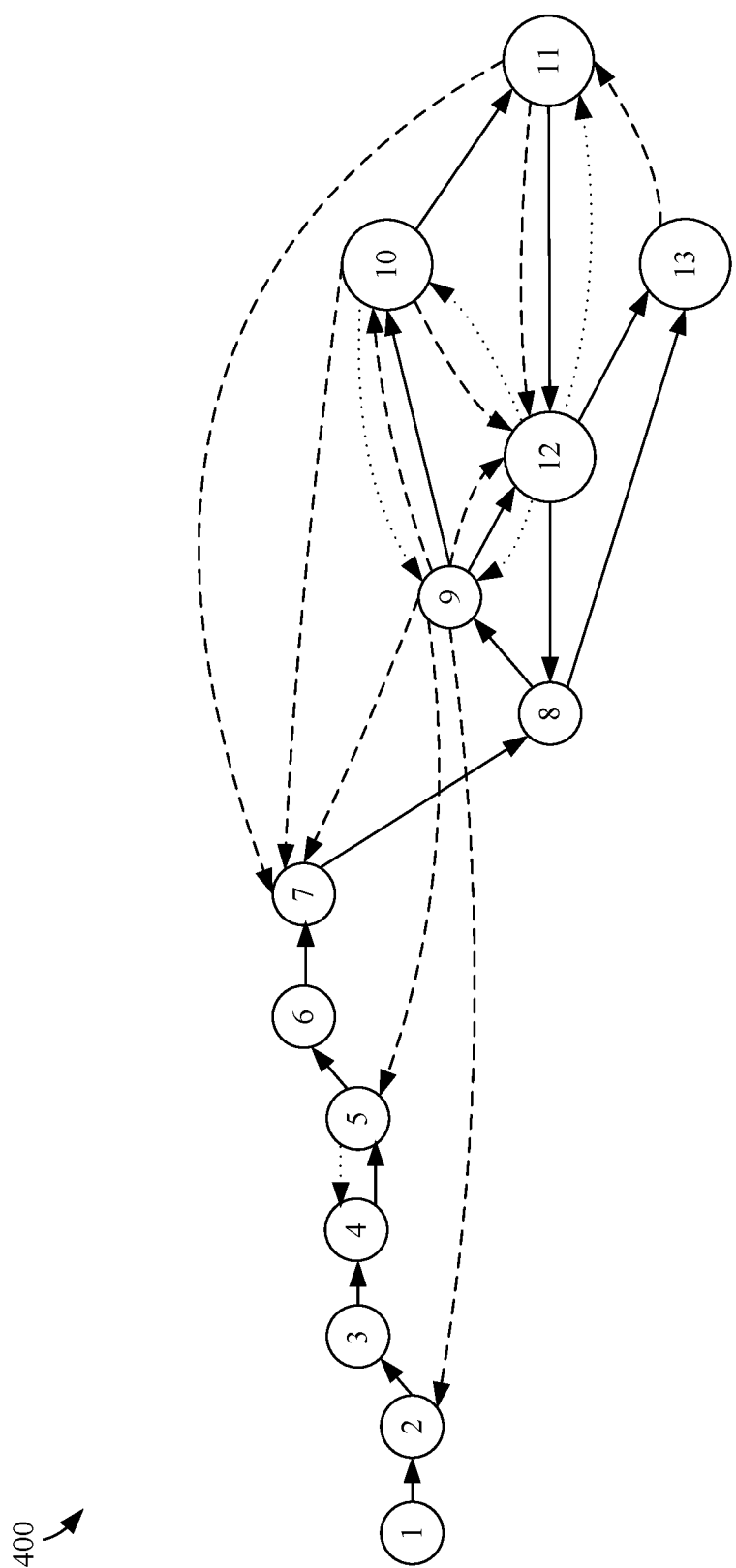
FIG. 4 is a control flow graph for a user defined function of Code Example 1, according to an example embodiment.

FIG. 4 is a control flow graph (CFG) 400 for a user defined function of Code Example 1, according to an example embodiment. Referring to FIG. 4, each statement 1-13 of Code Example 1 (above) is referenced in a separate basic block. The edges (solid arrowed lines) represent transfer of control between basic blocks during execution. CFG 400 has been augmented with data dependence edges where the dashed arrowed lines indicate flow and the dotted arrowed lines indicate anti-dependencies. This augmented CFG 400 (sometimes referred to as a program dependence graph (PDG)) may be used as the input to Aggify processor 108.

Data flow analysis is a program analysis technique that is used to derive information about the run time behavior of a program. The CFG of a program (e.g., CFG 400) is a directed graph where vertices represent basic blocks (a straight line code sequence with no branches) and edges represent transfer of control between basic blocks during execution. The CFG of the program may be a directed multi-graph in which program statements are nodes, and the edges represent data dependencies between statements. Data dependencies could be of different kinds, for example, flow dependency (read after write), anti-dependency (write after read), and output dependency (write after write). The entry and exit point of any node in the CFG is denoted as a program point.

3.2.1 A Framework for Data Flow Analysis

A data-flow value for a program point is an abstraction of the set of all possible program states that can be observed for that point. For a given program entity e, such as a variable or an expression, data flow analysis of a program involves (1) discovering the effect of individual program statements on e (called local data flow analysis), and (2) relating these effects across statements in the program (called global data flow analysis) by propagating data flow information from one node to another.

The relationship between local and global data flow information is captured by a system of data flow equations. The nodes of the CFG are traversed and these equations are iteratively solved until the system reaches a fixpoint. The results of the analysis can then be used to infer information about the program entity e.

3.2.2. UD and DU Chains.

When a variable v is the target of an assignment in a statement S, S is known as a Definition of v. When a variable v is on the right-hand-side (RHS) of an assignment statement S, S is known as a use of v. A use-definition (UD) chain is a data structure that comprises a use U of a variable, and all the definitions D of that variable that can reach that use without any other intervening definitions. A counterpart of a UD chain is a definition-use (DU) chain which consists of a definition D of a variable and all the uses U, reachable from that definition without any other intervening definitions. These data structures are created using data flow analysis.

3.2.3. Reaching Definitions Analysis.

Reaching definitions analysis is used to determine which definitions reach a particular point in the code. A definition D of a variable reaches a program point p if there exists a path leading from D to p such that D is not overwritten (killed) along the path. The output of this analysis can be used to construct the UD and DU chains, which are then used in transformations. For example, in Code Example 1, consider the use of the variable @lb inside the loop (line 9). There are at least two definitions of @lb that reach this use. One is the initial assignment of @lb to −1 as a default argument, and the other is assignment on line 5.

3.2.4. Live Variable Analysis.

Live variable analysis is used to determine which variables are live at each program point. A variable is said to be live at a point if it has a subsequent use before a re-definition. For example, consider the variable @lb in Code Example 1. This variable is live at every program point in the loop body. But at the end of the loop, it is no longer live as it is never used beyond that point. In the function minCostSupp, the only variable that is live at the end of the loop is @suppName. This analysis information is used in the Aggify technique as described below.

4. Overview of the Aggify Technique

Aggify is a technique performed by Aggify processor 108, which provides a solution to the limitations and performance problems of cursor loops. It may achieve this goal by replacing an entire cursor loop (e.g., cursor 112) with an SQL query (e.g., declarative SQL query with custom aggregate invocation 130) that invokes a custom aggregate that is systematically constructed. Performing such a rewrite that provides equivalence in semantics is nontrivial. The following key challenges involved are involved here. The body of the cursor loop (e.g., loop body 116) could be arbitrarily complex, with cyclic data dependencies and complex control flow. The query (e.g., SQL query 114) on which the cursor is defined could also be arbitrarily complex, having subqueries, aggregates and so on. Furthermore, the UDF or stored procedure (e.g., UDF or stored procedure 106, or application 120) that comprises this loop may define variables that are used and modified within the loop.

The following sections describe how the Aggify technique, which is performed by Aggify processor 108, may achieve the goal of rewriting the query as semantically equivalent to the cursor loop. The Aggify technique primarily involves two phases. The first phase is to construct a custom aggregate by analyzing the loop (e.g., loop body 116), as described below. Then, the next step is to rewrite the cursor query (e.g., SQL query 114) to make use of the custom aggregate and remove the entire loop (e.g., cursor 112), as described below.

4.1 Applicability

Before delving into the Aggify technique, the class of cursor loops that can be transformed using the Aggify technique are formally characterized and the supported operations inside such loops are specified.

Definition 1.1: a Cursor Loop (CL) is defined as a tuple (Q, $\Delta$) where Q is any SQL SELECT query and $\Delta$ is a program fragment that can be evaluated over the results of Q, one row at a time.

Observe that in the above definition, the loop body ($\Delta$) (e.g., loop body 116) is neither specific to a programming language nor to the execution environment. The loop can be implemented using either procedural extensions of SQL or using programming languages such as Java. Definition 1 therefore encompasses the loops included in Code Example 1 and Code Example 2 (e.g., cursor 112). In general, statements in a loop can include arbitrary operations that may even mutate the persistent state of the database. Such loops cannot be transformed by the Aggify technique, since aggregates by definition cannot modify a database state. The following theorem defines the applicability of the Aggify technique.

Theorem 1.2. Any cursor loop CL(Q, $\Delta$) (e.g., cursor 112) that does not modify the persistent state of the database can be equivalently expressed as a query Q' (e.g., declarative SQL query with custom aggregate invocation 130) that invokes a custom aggregate function Agg$\Delta$ (e.g., custom aggregate function 128).

Proof. The theorem is proven in three steps:

(1) A technique is described below to systematically construct a custom aggregate function Agg$_\Delta$ (e.g., custom aggregate function 128) for a given cursor loop CL(Q, $\Delta$) (e.g., cursor 112).

(2) A rewrite rule is described below, which can be used to rewrite the cursor loop (e.g., cursor 112) as a query Q' that invokes Agg$_\Delta$ (e.g., declarative SQL query with custom aggregate invocation 130 invokes custom aggregate function 128).

(3) It is shown below that the rewritten query Q' is semantically equivalent to the cursor loop CL(Q, $\Delta$) (e.g., declarative SQL query with custom aggregate invocation 130 may be semantically equivalent to cursor 112). By steps (1), (2), and (3), the theorem follows.

Observe that Theorem 1 encompasses a fairly large class of loops encountered in the field. More specifically, this covers all cursor loops present in user-defined functions (UDFs). This is because UDFs by definition are not allowed to modify the persistent state of the database. As a result, cursor loops inside such UDFs can be rewritten using an Aggify technique by Aggify processor 108. Note that this theorem only states that a rewrite is possible; it does not necessarily imply that such a rewrite will always be more efficient. There are several factors that influence the performance improvements due to this rewrite.

4.2 Supported Operations

The Aggify technique of Aggify processor 108 may support all operations inside a loop body that are admissible inside a custom aggregate (e.g., custom aggregate function 128). The particular set of operations supported inside a custom aggregate varies across DBMSs such as DBMS SQL server 102. However, in general, this is a broad set that includes procedural constructs such as variable declarations, assignments, conditional branching, nested loops (cursor and non-cursor) and function invocations. All scalar and table or collection data types are supported. A formal language model that is supported, is given below.

expr ::=Constant|var|Func( . . . )|Query( . . . )

|¬expr|expr1 op expr2 op::=+|−|*|/|<|>| . . .

Stmt ::=skip|Stmt; Stmt|var:=expr

|if expr then Stmt else Stmt

|while expr do Stmt

|try Stmt catch Stmt

Program ::=Stmt

Nested cursor loops are supported as described below. SQL SELECT queries inside the loop are fully supported. DML operations (e.g., INSERT, UPDATE, DELETE) on local table variables or temporary tables or collections are supported. Exception handling code (e.g., TRY . . . CATCH) can also be supported. Nested function calls are supported. Operations that may change the persistent state of the database (e.g., DML statements against persistent tables, transactions, configuration changes etc.) are not supported. Unconditional jumps such as BREAK and CONTINUE can be supported using Boolean variables to keep track of control flow. Operations having side-effects can be supported only if the DBMS allows these operations inside a custom aggregate (e.g., custom aggregate function 128). The core Aggify technique of Aggify processor 108 is described below in more detail.

5. Aggregate Construction

Given a cursor loop (Q, Δ) (e.g., cursor 112) the goal is to construct a custom aggregate (e.g., custom aggregate function 128) that is equivalent to the body of the loop Δ (e.g., loop body 116). As described above in Section 3.1, the aggregate function contract may involve 3 methods (i.e., member functions) including Inn, Accumulate, and Terminate that comprise the target of the custom aggregate function construction. Constructing custom aggregate function 128 involves specifying its signature (e.g., return type and parameters), fields, and constructing the three method definitions. Code Example 3 comprises an aggregate class template for starting the aggregate construction. The code snippet of Code Example 3 illustrates the aggregation contract. The patterns «» in Code Example 3 indicate "holes" to be filled with code fragments inferred from the loop (e.g., loop body 116).

Code Example 3: Aggregate Class Template for a Custom Aggregate Function

```
public class LoopAgg {
    << Field declarations for VF >>
    void Init( ) {isInitialized = false; }
    void Accumulate(<< Param specs for Paccum >>) {
        if (!isInitialized) {
            << Assignments for Vinit >>
            isInitialized = true;
        }
        << Loop body Δ >>
    }
    <<TYPE(Vterm)>> Terminate( ){ return << Vterm >>; }
}
```

An example construction of an aggregate function (e.g., custom aggregate function 128) utilizing the aggregate class template of Code Example 3, is shown in Code Examples 4 and 5 utilizing code fragments from Code Examples 1 and 2 respectively.

Code Example 4: Custom Aggregate for the Loop in Code Example 1

```
public class MinCostSuppAgg {
    double minCost; string suppName;
    int lb; bool isInitialized;
    void Init( ) { isInitialized = false; }
    void Accumulate (double pCost, string sName, double pMinCost, int pLb) {
        if (!isInitialized) {
            minCost = pMinCost;
            lb = pLb;
            isInitialized = true;
        }
        if(pCost < minCost && pCost > lb) {
            minCost = pCost;
            suppName = sName;
        }
    }
    string Terminate( ) { return suppName; }
}
```

Code Example 5: Custom Aggregate for the Loop in Code Example 2

```
public class CumulativeReturnAgg {
    double cumulativeROI; bool isInitialized;
    void Init( ) { isInitialized = false; }
    void Accumulate(double monthlyROI, double pCumulativeROI) {
        if (!isInitialized) {
            cumulativeROI = pCumulativeROI;
            isInitialized = true;
        }
        cumulativeROI=cumulativeROI*(monthlyROI + 1);
    }
    double Terminate( ) { return cumulativeROI; }
}
```

5.1 Fields

Conservatively speaking, variables that are live at the beginning of the loop (e.g., loop body 116) can be made fields of the aggregate (e.g., custom aggregate function 128). A minimal set of fields may be defined as follows. Consider the set $V_A$ of all variables referenced in the loop body Δ (e.g., loop body 116). Let $V_{fetch}$ be the set of variables assigned in the FETCH statement, and let $V_{local}$ be the set of variables that are local to the loop body (e.g., the set of variables that are declared within loop body 116 and are not live at the end of the loop). The set of variables $V_F$ defined as fields of the custom aggregate (e.g., custom aggregate function 128) is given by Equation 1:

$$V_F=(V_A-(V_{fetch} \cup V_{local})) \cup \{isInitialized\}. \quad (1)$$

Moreover, a variable called isInitialized has been added to the field variables set $V_F$. This Boolean field is utilized for keeping track of field initialization, and will be described below. For all variables in $V_F$, a field declaration statement may be placed in the custom aggregate class.

Illustration: For the loop in Code Example 1:
$V_A$={pCost, minCost, lb, suppName, sName}
$V_{fetch}$={pCost, sName}
$V_{local}$={ }
Therefore, using Equation 1:

$$V_F=\{minCost, lb, suppName, isInitialized\} \quad 1$$

For application programs such as the one in Code Example 2 that use a data access API (e.g., JDBC) the attribute accessor methods (e.g. getInt( ) getString( ) etc.) on the ResultSet object are treated analogous to the FETCH statement. Therefore, local variables to which ResultSet attributes are assigned from a part of the $V_{fetch}$ set. For the loop in Code Example 2,
$V_A$={cumulativeROI, monthlyROI}
$V_{fetch}$={monthlyROI}
$V_{local}$={ }
Therefore, using Equation 1:

$$V_F=\{cumulativeROI, isInitialized\} \quad 1$$

5.2 Init( )

Implementation of the Init( ) method is very simple. A statement is added that assigns the Boolean field isInitialized to false. Description of initialization of field variables is deferred to the Accumulate( ) method for the following reason. The Init( ) method does not accept any arguments. Hence if field initialization statements are placed in Init( ), they will have to be restricted to values that are statically determinable. This is because these values will have to be supplied at aggregate function creation time. In practice it is quite likely that these values are not statically determinable. This could be because (a) they are not compile-time constants but are variables that hold a value at runtime, or (b) there are multiple definitions of these variables that might reach the loop, due to presence of conditional assignments.

Consider the loop of Code Example 1. Based on Equation 1, it has been determined that the variable @lb is a field of the custom aggregate. The initialization of @lb may not be placed in Init( ) because the initial value of @lb may not be determined at compile-time using static analysis of the code. This restriction is overcome by deferring field initializations to Accumulate( ).

Illustrations: The Init( ) method is identical in both Code Examples 4 and 5, having an assignment of isInitialized to false.

5.3 Accumulate( )

In a custom aggregate (e.g., custom aggregate function 128), the Accumulate( ) method may encapsulate important computations. Parameters and a definition of Accumulate( ) are described below.

5.3.1 Parameters

Let $P_{accum}$ denote a set of parameters which is identified as the set of variables that are used inside the loop body (e.g., loop body116) and have at least one reaching definition outside the loop body. The set of candidate variables may be computed using the results of reaching definitions analysis (described above in Section 3.2.3). More formally, let $V_{use}$ be the set of all variables used inside loop body 116. For each variable $v \in V_{use}$, let UCL (v) be the set of all uses of v inside the cursor loop CL (e.g., cursor 112). Now, for each use u ∈ UCL (v), let RD(u) be the set of all definitions of v that reach the use u. A function R(v) is defined as follows:

$$R(v)=1, \text{ if } \exists d \in RD(u) | d \text{ is not in the loop}, =0, \text{otherwise}. \quad (2)$$

Checking if a definition d is in the loop or not is a simple set containment check. Using Equation 2, $P_{accum}$, the set of parameters for Accumulate( ), is defined as follows:

$$P_{accum}=\{v | v \in V_{use} \wedge R(v)==1\} \quad (3)$$

5.3.2 Method Definition

There are two blocks of code that form the definition of Accumulate( ) including the field initializations and the loop body block. The set of fields $V_{init}$ that are initialized is given by the following equation:

$$V_{init}=P_{accum}-V_{fetch} \quad (4)$$

As described above, the Boolean field isInitialized denotes whether the fields of this class are initialized or not. The first time Accumulate( ) is invoked for a group, isInitialized is false and hence the fields in $V_{init}$ are initialized. During subsequent invocations, this block is skipped as isInitialized would be true. Following the initialization block, the entire loop body Δ (e.g., loop body 116) is appended to the definition of Accumulate( ).

Illustrations: For the loop in Code Example 1:
$P_{accum}$={pCost, sName, pMinCost, pLb}
$V_{init}$={minCost, lb}
For the loop in Code Example 2, $P_{accum}$ and $V_{init}$ are as follows:
$P_{accum}$={monthlyROI, cumulativeROI}
$V_{init}$={cumulativeROI}

The Accumulate( ) method in Code Examples 4 and 5 are constructed based on the above equations as per the template in Code Example 3.

5.4 Terminate( )

This method returns a tuple of all the field variables ($V_F$) that are live at the end of the loop. The set of candidate variables $V_{term}$ are identified by performing a liveness analysis for the module (e.g., UDF or stored procedure 106, or application 120) enclosing the cursor loop (e.g. cursor 112). The return type of the aggregate is a tuple where each attribute corresponds to a variable that is live at the end of the loop. The tuple datatype can be implemented using user-defined types in most DBMSs (e.g., DBMS SQL server 102).

Illustrations: For the loop in Code Example 1, $V_{term}$={suppName}, and for the loop in Code Example 2, $V_{term}$={cumulativeROI}. For simplicity, since these are single-attribute tuples, use of a tuple is avoided and the type of the attribute is used as the return type of Terminate( ).

6. Query Rewriting

For a given cursor loop (Q, Δ) (e.g., cursor 112), once the custom aggregate Agg$_\Delta$ (e.g., custom aggregate function 128) has been created, the next task is to remove the loop (cursor 112) altogether and rewrite the query Q (e.g., SQL query 114) into Q' (e.g., declarative SQL query with custom aggregate invocation 130) such that it invokes this custom aggregate (e.g., custom aggregate 128) instead. Note that Q might be arbitrarily complex, and may contain other aggregates (built-in or custom), GROUP BY, subqueries, and so on. Therefore, Aggify constructs Q' without modifying Q directly, but by composing Q as a nested sub-query. In other words, the Aggify technique of Aggify processor 108 introduces an aggregation on top of Q (e.g., SQL query 114) that contains an invocation to Agg$_\Delta$ (e.g., custom aggregate 128). Note that Agg$_\Delta$ is the only attribute that needs to be projected, as it contains all the loop variables that are live. In relational algebra, this rewrite rule can be represented as follows:

$$\text{Loop}(Q,\Delta) = \Rightarrow G_{Agg\Delta}(P_{accum}) \text{ as aggVal}(Q) \quad (5)$$

Note that the parameters to Agg$_\Delta$ (e.g., custom aggregate 128) are the same as the parameters to the Accumulate( ) method ($P_{accum}$). These are either attributes that are projected from Q (e.g., SQL query 114) or variables that are defined earlier. The return value of Agg$_\Delta$ (aliased as aggVal) (e.g., custom aggregate 128), is a tuple from which individual attributes can be extracted. The details are specific to SQL dialects.

Illustration: Code Example 6 below shows the output of rewriting the UDF (e.g., UDF 106) in Code Example 1 using the Aggify technique of Aggify processor 108. Observe the statement that assigns to the variable @suppName where the R. H. S. is a SQL query. This is the resulting query corresponding to the loop in Code Example 1. The aggregate MinCostSuppAgg is defined in Code Example 4.

Code Example 6: The UDF in Code Example 1
Rewritten According to the Aggify Technique

```
create function minCostSupp(@pkey int, @lb int = -1)
returns char(25) as
begin
    declare @minCost decimal(15,2) = 100000;
    declare @suppName char(25);
    if (@lb = -1)
        set @lb = getLowerBound(@pkey);
    set @suppName = (
        SELECT MinCostSuppAgg(Q.ps_supplycost, Q.s_name, @minCost, @lb)
            FROM (SELECT ps_supplycost, s_name
                FROM PARTSUPP, SUPPLIER
                WHERE ps_partkey = @pkey
                AND ps_suppkey = s_suppkey) Q );
    return @suppName;
end
```

Code Example 7 below shows the Java method from Code Example 2 rewritten by Aggify processor 108. Out of the 2 parameters to the aggregate function (e.g., custom aggregate function 128), one is an attribute from the underlying query, and the other is a local variable. The loop is replaced with a method that advances the ResultSet to the first (and only) row in the result, and an attribute accessor method invocation (getDouble( ) in this case) is placed with an assignment to each of the live variables (cumulativeROI in this case).

Code Example 7—the Java Method of Code
Example 2 Rewritten Using The Aggify Technique

```
double computeCumulativeReturn(int id, Date from) {
    double cumulativeROI = 1.0;
    Statement stmt = conn.prepareStatement(
        "SELECT CumulativeReturnAgg(Q.roi, ?) AS croi
            FROM (SELECT roi FROM monthly_investments
                WHERE investor_id = ?
                AND start_date = ?) Q");
    stmt.setDouble(1, cumulativeROI);
    stmt.setInt(2, id); stmt.setDate(3, from);
    ResultSet rs = stmt.executeQuery( );
    rs.next( );
    cumulativeROI = rs.getDouble("croi");
    cumulativeROI = cumulativeROI - 1;
    rs.close( ); stmt.close( ); conn.close( );
    return cumulativeROI;
}
```

6.1 Order Enforcement

The query Q (e.g., SQL query 114) over which a cursor (e.g., cursor 112) is defined may be arbitrarily complex. If Q does not have an ORDER BY clause, the DBMS (e.g., DBMS SQL server 102) gives no guarantee about the order in which the rows are iterated over. Equation 5 is in accordance with this, because the DBMS gives no guarantee about the order in which the custom aggregate (e.g., custom aggregate function 128) is invoked as well. Hence the above query rewrite suffices in this case.

However, the presence of ORDER BY in the cursor query Q (e.g., SQL query 114) implies that the loop body Δ (e.g., loop body 116) is invoked in a specific order determined by the sort attributes of Q. In this case, the above rewriting is not sufficient as it does not preserve the ordering and may lead to wrong results. Therefore, either there should be no ORDER BY clause in the cursor query, or the database system should allow order enforcement while invoking custom aggregates. To address this, a minor variation of the above rewrite rule is introduced, which can be used to enforce the necessary order.

Let $Q_s$ represent a query with an ORDER BY clause where the subscripts denotes the sort attributes. Let Q represent the query $Q_s$ without the ORDER BY clause. For a cursor loop ($Q_s$, Δ) (e.g., cursor 112), the rewrite rule can be stated as follows:

$$\text{Loop}(Q_s, \Delta) = \Rightarrow G_{StreamAgg_\Delta}(P_{accum}) \text{ as aggVal}(\text{Sort}_s(Q)) \quad (6)$$

This rule enforces two conditions. (i) It enforces the sort operation to be performed before the aggregate (e.g., custom aggregate function 128) is invoked, and (ii) it enforces the Streaming Aggregate physical operator to implement the custom aggregate. These two conditions ensure that the order specified in the cursor loop (e.g., cursor 112) is respected.

6.2 Discussion

Once the query is rewritten (as described above), Aggify processor 108 replaces the loop (cursor 112) with an invocation to the rewritten query (e.g., declarative SQL query with custom aggregate 130) as shown in Code Examples 6 and 7 (above). The return value of aggregate function 128 is assigned to corresponding local variables, which enables subsequent lines of code to remain unmodified. With reference to Code Examples 6 and 7, the following observations can be made:

The cursor query Q (e.g., SQL query 114) remains unchanged, and is now the subquery that appears in the FROM clause.

The transformation is fairly non-intrusive. Apart from the removal of the loop, the rest of the lines of code remain the same, except for a few minor modifications.

This transformation may render some variables as dead. Declarations of such variables can be then removed, thereby further simplifying the code. For instance, the variables @pCost and @sName in Code Example 1 (above) are no longer required, and are removed in Code Example 6.

The transformed program of the Aggify technique offers the following benefits. It avoids materialization of the cursor query results, and instead, the entire loop is now a single pipelined query execution. In the context of loops in applications that run outside DBMS SQL server 102 (e.g., Code Example 7, or application 120), this rewrite procedure reduces the amount of data transferred between DBMS SQL server 102 and client device 104. Further, the entire loop computation now runs inside DBMS SQL server 102 in query processing engine 110, closer to data accessed via storage engine 132. Finally, all these benefits are achieved without intrusive changes to source code.

6.3 The Aggify Technique

The Aggify techniques described above with respect to Aggify processor 108 are formally presented in Aggify Technique 1 below.

Aggify Technique 1: Aggify(G, Q, Δ)

Input: G: CFG of the program augmented with data dependence edges;
Q: Cursor query;
Δ: Subgraph of G for the loop body;
A(L, R, UD, DU)←Perform DataFlow Analysis on G;
    L←Liveness information;
    RD←Reachable Definitions;
    UD,DU←Use-Definition Chain, Definition-Use Chain;
$V_\Delta$←{Variables referenced in Δ};
$V_{fetch}$←{Vars. assigned in the FETCH statement};
$V_{field}$←{Compute using Equation 1};
$P_{accum}$←{Compute using Equation 3};
$V_{init}$←{Compute using Equation 4};
$V_{term}$←{Fields that are live at loop end};
$Agg_\Delta$←Construct aggregate class using template in Code Example 3 and above information;
Register $Agg_\Delta$ with the database;
if (Q contains ORDER BY clause) then
    s←{ORDER BY attributes}
    Rewrite loop using Equation 6; else
    Rewrite loop using Equation 5;

Aggify Technique 1 accepts G, the CFG (e.g., CFG 400) of the program (e.g., UDF or stored procedure 106, or application 120) augmented with data dependence edges, Q, the cursor query (e.g., SQL query 114), and A, the subgraph of G corresponding to the loop body (e.g., loop body 116). Aggify Technique 1 is invoked for every loop after necessary preconditions (described above with respect to supported operations of Section 4.2) are satisfied.

Initially the DataFlow Analyses is performed on G (see Section 3 above). The results of these analyses are captured as A(L, RD,UD, DU) which may comprise liveness, reachable definitions, use-definition chain, and definition-use chain, respectively. Then, these results may be used to compute the components of the aggregate definition, namely $V_\Delta$, $V_{init}$, $V_{fetch}$, $V_{field}$, $V_{term}$, $P_{accum}$. Once all the necessary information is computed, the aggregate definition (custom aggregate function 128) is constructed using the aggregate class template in Code Example 3, and this aggregate (AggΔ, or custom aggregate function 128) is registered with storage engine 110. Finally, the entire loop (e.g., cursor 112) is rewritten with a query that invokes $Agg_\Delta$. The rewrite rule is chosen based on whether the cursor query Q (e.g., SQL query 114) has an ORDER BY clause (see Section 6. above).

Figure 5:
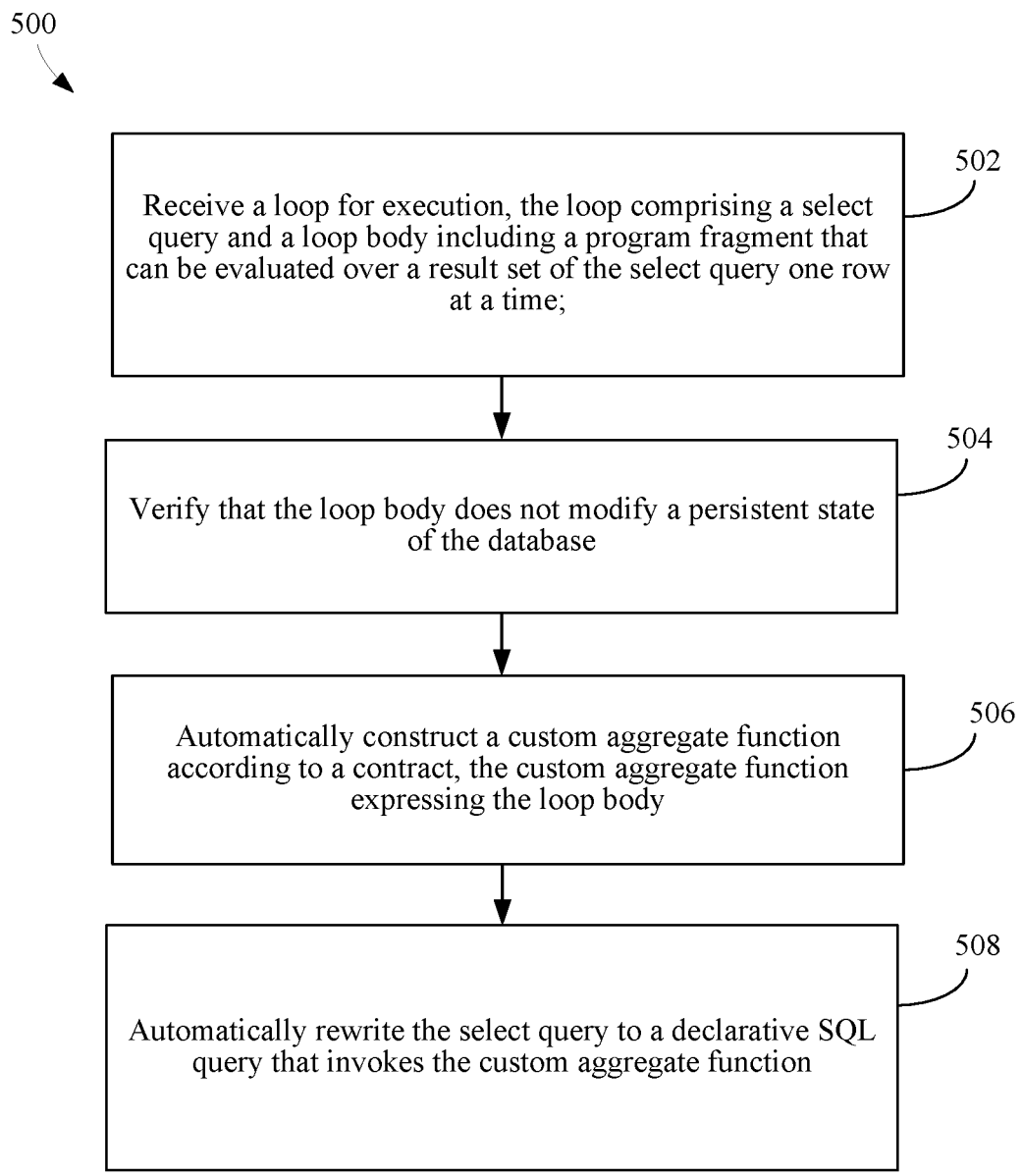
FIG. 5 is a flowchart of a method for automatically converting a query loop to a declarative SQL query that invokes a custom aggregate function, according to an example embodiment.

In embodiments, systems 100 and 300 may operate in various ways to perform their functions. For example, FIG. 5 is a flowchart 500 of a method for automatically converting a query loop to a declarative SQL query that invokes a custom aggregate function, according to an example embodiment. In one embodiment, flowchart 500 may be performed by Aggify processor 108 of DBMS SQL server 102 or of client device 104. For the purpose of illustration, flowchart 500 of FIG. 5 is described with reference to FIGS. 1, 3, and 4.

Flowchart 500 of FIG. 5 begins with step 502. In step 502, a loop is received for execution, the loop comprising a select query and a loop body including a program fragment that can be evaluated over a result set of the select query one row at a time. For example, cursor 112 is received for execution, wherein cursor 112 comprises a SQL query 114 and loop body 116 including a program fragment that can be evaluated over a result set of SQL query 114 one row at a time. As noted above, Aggify processor 108 may be instantiated in client device 104 and may be configured to receive cursor 112 from application 120 of client device 104. Aggify processor 108 may also be instantiated in DBMS SQL server 102 and receive cursor 112 including SQL query 114 and loop body 116 from UDF or stored procedure 106 of DBS SQL server 102. Moreover, Aggify processor 108 may be instantiated in DBMS SQL server 102 and receive cursor 112 including SQL query 114 and loop body 116 from application 120 of client device 104.

In step 504, it is verified that the loop body does not modify a persistent state of the database. For example, precondition verifier 320 is configured to verify that loop body 116 does not modify a persistent state of a database (e.g., a database accessed via storage engine 132). More specifically, parser 310 may be configured to receive and perform syntax checks on SQL query 114 and loop body 116 of cursor 112. As a result, parser 310 is configured to output a parsed tree based on SQL query 114 and loop body 116 to algebrizer 312. Algebrizer 312 is configured to receive the parsed tree as input for binding. Algebrizer 312 is configured to perform semantic checks to determine whether statements of SQL query 114 and loop body 116 are meaningful (e.g., whether objects and columns in the statement exist). Algebrizer 312 may be configured to identify data types which are being processed for the query. Algebrizer 312 may output a query processor tree to precondition verifier 320. Precondition verifier 320 is configured to receive the output from algebrizer 312 and verify that the SQL query 114 and loop body 116 of cursor 112 includes supported operations. For example, precondition verifier 320 may verify that loop body 116 does not modify a persistent state of a database (e.g., using data manipulation language (DML) statements against persistent tables, transactions, configuration changes, etc.).

In step 506, a custom aggregate function is automatically constructed according to a contract, the custom aggregate function expressing the loop body. For example, custom aggregate function constructor 322 is configured to automatically construct custom aggregate 128 according to a contract (e.g., an aggregation contract). The contract may include methods comprising an Init method, an Accumulate method, a Terminate method, and a Merge method, where the Merge method is optional. The names of these methods may vary across DBMSs. Custom aggregate function constructor 322 may automatically construct custom aggregate function 128 during compile time according to the methods of the contract. Custom aggregate function 128 may accept a collection of values (e.g., multiple rows from a table) as input, and return a value according to the query.

In step 508, the select query is automatically rewritten to a declarative SQL query that invokes the custom aggregate function. For example, select query 114 may be automatically rewritten to form declarative SQL query that invokes custom aggregate function 130. Declarative SQL query that invokes custom aggregate function 130 may be semantically equivalent to cursor 112 and output of custom aggregate function 128 may be identical to the program state at the end of cursor 112. Therefore, cursor 112 may be removed from application 120 or UDF or stored procedure 106.

Note that, in embodiments, if it is determined in step 504 that the loop body does modify a persistent state of the database, then steps 506 and 508 will not be performed. That is to say, if the loop body is determined to modify a persistent state of the database, it may be determined that the loop cannot be converted to a declarative SQL query that invokes a custom aggregate function and thus the loop must be executed in its original state.

Figure 6:
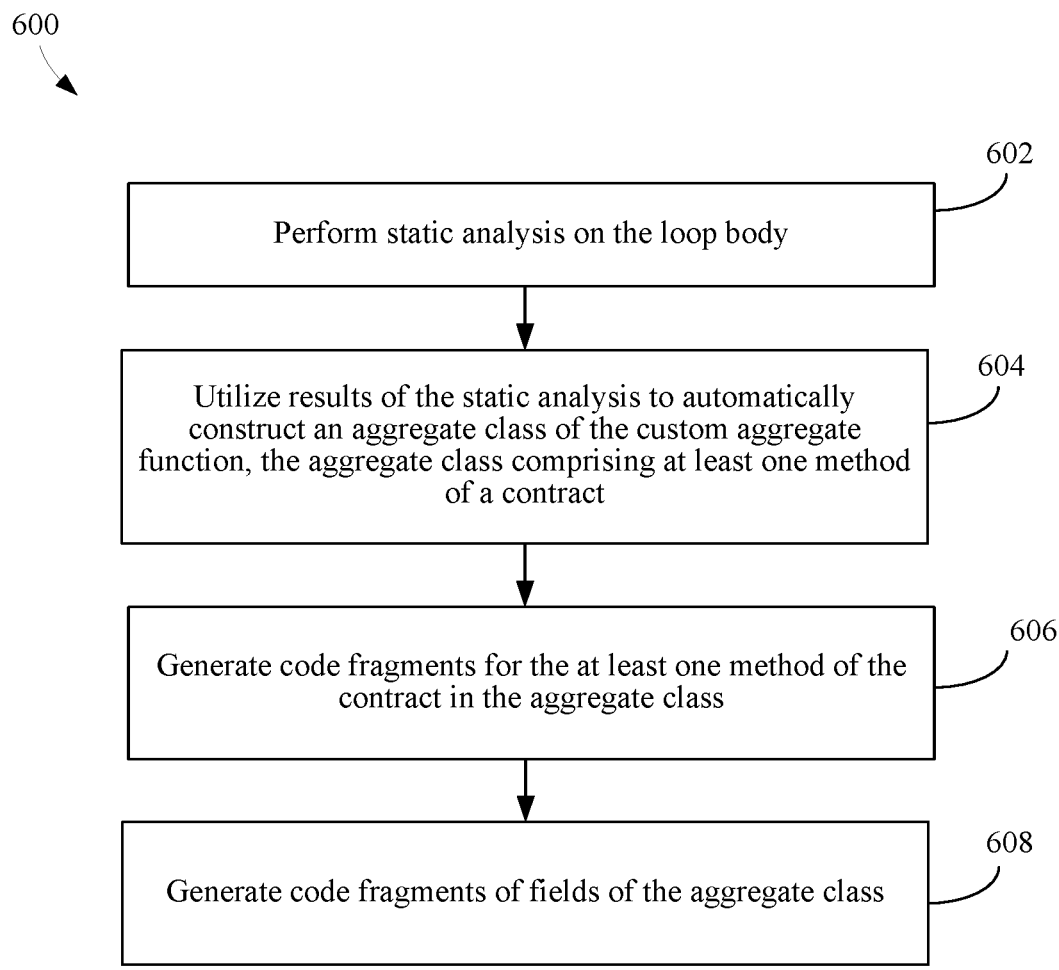
FIG. 6 is a flowchart of a method for generating an aggregate class based on static analysis of a loop body, according to an example embodiment.

In embodiments, systems 100 and 300 may operate in various ways to perform their functions. For example, FIG. 6 is a flowchart 600 of a method for generating an aggregate class, according to an example embodiment. In one embodiment, flowchart 600 may be performed by Aggify processor 108 instantiated in DBMS SQL server 102, or by Aggify processor 108 instantiated in client device 104. For the purpose of illustration, flowchart 600 of FIG. 6 is described with reference to FIGS. 1, 3, and 4.

Flowchart 600 of FIG. 6 begins with step 602. In step 602, static analysis is performed on the loop body. For example, static analysis engine 330 of custom aggregate function constructor 322 performs static analysis on loop body 116. Static analysis engine 330 may receive a CFG of cursor 112 augmented with data dependence edges, the SQL query 114, and loop body 116. Static analysis engine 330 may perform data flow analysis on the cursor 112 CFG and generate one or more of liveness information, reachable definitions, a use definition chain, and a definition use chain.

In step 604, results of the static analysis are used to automatically construct an aggregate class of the custom aggregate function, the aggregate class comprising at least one method of a contract. For example, custom aggregate function constructor 322 may utilize the results (e.g., liveness and reachability) of the static analysis from static analysis engine 330 to automatically construct generate an aggregate class of custom aggregate function 128. The aggregate class may be constructed using the template of Code Example 3, as described above. Variables used inside loop body 116 may have at least one reaching definition outside the loop body. Constructing custom aggregate function 128 involves specifying its signature (return type and parameters), fields, and constructing method definitions. Static analysis engine 330 analyzes the source code of cursor 112 and of the loop body 116, and custom aggregate function constructor 322 populates blanks in the aggregate class (e.g., within the angular brackets «» shown in Code Example 3). The aggregate class is registered with storage engine 132.

In step 606, code fragments are generated for the at least one method of the contract in the aggregate class. For example, custom aggregate function constructor 322 is also configured to generate code fragments for the methods in the aggregate class. The code fragments populated in the aggregate class template (e.g., within the angular brackets «» shown in Code Example 3). The Accumulate method may include a code fragment comprising loop body 116 (e.g., a pattern «» of the Accumulate function in Code Example 3 indicates where to place code fragments inferred from the loop Δ (e.g., loop body 116).

In step 608, code fragments of fields of the aggregate class are generated. For example, as described above, custom aggregate function constructor 322 may generate code fragments of the fields of the aggregate class. Field declarations may be populated within the angular brackets «» shown in Code Example 3. The fields may maintain the internal state of custom aggregate function 128.

Figure 7:
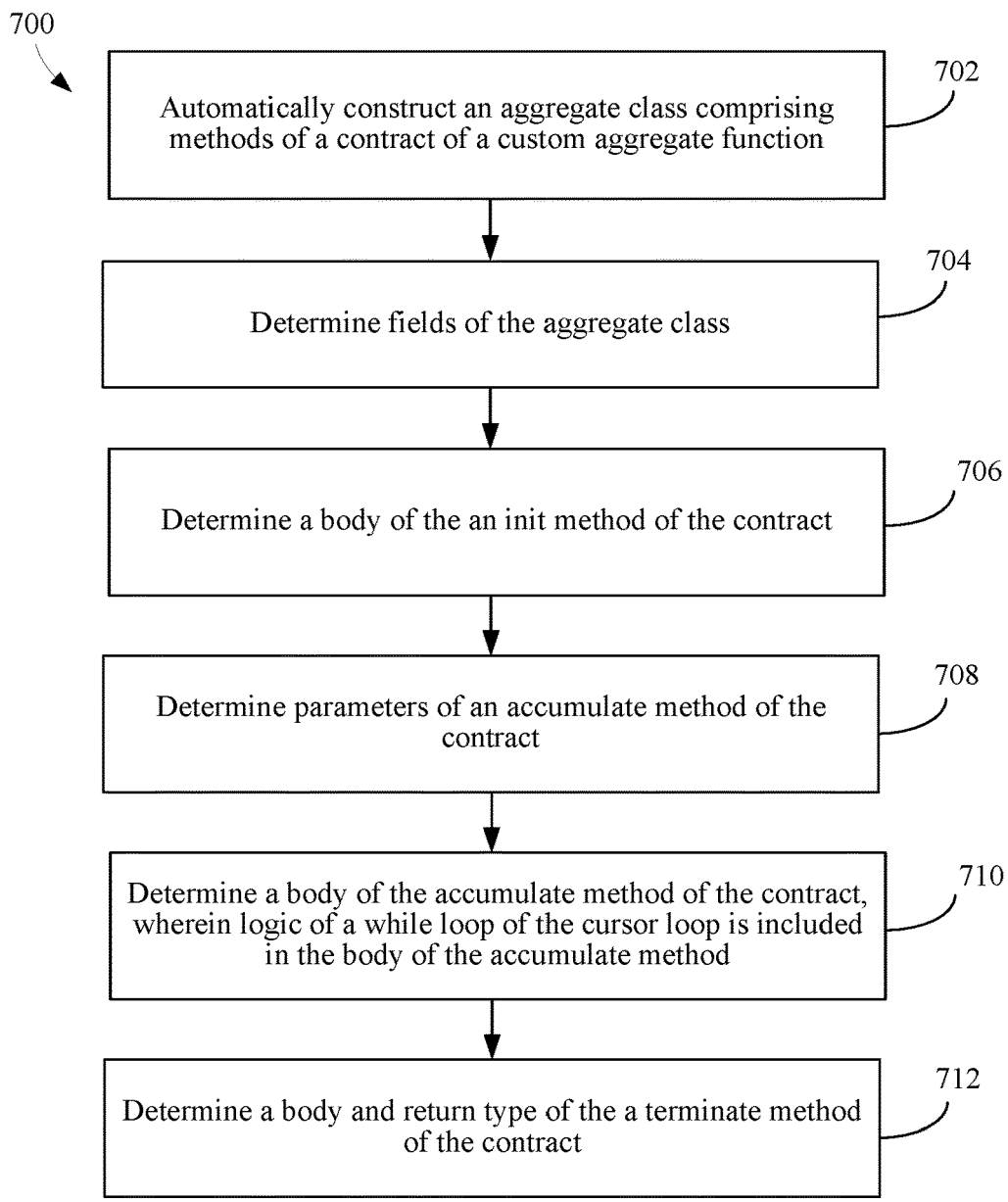
FIG. 7 is a flowchart of a method for automatically generating an aggregate class based on methods of a contract, according to an example embodiment.

In embodiments, systems 100 and 300 may operate in various ways to perform their functions. For example, FIG. 7 is a flowchart of a method for automatically generating an aggregate class based on methods of a contract, according to an example embodiment. In one embodiment, flowchart 700 may be performed by Aggify processor 108 instantiated in DBMS SQL server 102, or by Aggify processor 108 instantiated in client device 104. For the purpose of illustration, flowchart 700 of FIG. 7 is described with reference to FIGS. 1, 3, and 4.

Flowchart 700 of FIG. 7 begins with step 702. In step 702, an aggregate class is automatically constructed where the aggregate class comprises methods of a contract of a custom aggregate function. For example, for cursor 112, custom aggregate function constructor 322 automatically populates the aggregate class template of Code Example 3, within the angular brackets «».

In step 704, fields of the aggregate class are determined. For example, custom aggregate function constructor 322 determines field declarations for the aggregate class (e.g., «Field declarations for $V_F$» shown in Code Example 3). Variables that are live at the beginning of loop body 116 can be made fields of custom aggregate function 128. A set of fields may be defined as follows. Consider the set $V_A$ of all variables referenced in the loop body 116. Let $V_{fetch}$ be a set of variables assigned in a FETCH statement, and let $V_{local}$ be a set of variables that are local to the loop body (e.g., the set of variables that are declared within loop body 116 and are not live at the end of the loop). The set of variables $V_F$ defined as fields of custom aggregate function 128 are given by Equation 1. In some embodiments, a variable called isInitialized may be added to the field variables set $V_F$. This Boolean field is utilized for keeping track of field initialization.

In step 706, a body of the an Init method of the contract is determined. For example, custom aggregate function constructor 322 determines the Init method for the aggregate class (e.g., void Init( ) {isInitialized=false; } of Code Example 3). The implementation of the Init( ) method includes adding a statement that assigns the Boolean field isInitialized to false. As described above, description of the initialization of field variables is deferred to the Accumulate ( ) method. In this regard, the Init( ) method does not accept any arguments. Hence if field initialization statements are placed in Init( ), they will have to be restricted to values that are statically determinable. This is because these values will have to be supplied at aggregate function creation time. However, these values may not be statically determinable. This could be because (a) they are not compile-time constants but are variables that hold a value at runtime, or (b) there are multiple definitions of these variables that might reach the loop, due to presence of conditional assignments.

In step 708, parameters of an Accumulate method of the contract are determined. For example, custom aggregate function constructor 322 determines parameters for populating the Accumulate function of the aggregate class (e.g., void Accumulate(«Param specs for $P_{accum}$» shown in Code Example 3). In a custom aggregate function 128, the Accumulate( ) method may encapsulate important computations. Parameters and a definition of Accumulate( )) are described as follows. Let $P_{accum}$ denote a set of parameters which is identified as the set of variables that are used inside loop body 116 and have at least one reaching definition outside the loop body. The set of candidate variables may be computed using the results of reaching definitions analysis (described above in Section 3.2.3). Let $V_{use}$ be the set of all variables used inside loop body 116. For each variable $v \in V_{use}$, let UCL (v) be the set of all uses of v inside the cursor loop CL (e.g., cursor 112). Now, for each use $u \in UCL$ (v), let RD(u) be the set of all definitions of v that reach the use u. A function R(v) is defined according to Equation 2. Checking if a definition d is in the loop or not is a simple set containment check. Using Equation 2, $P_{accum}$, the set of parameters for Accumulate( ), is defined according to Equation 3.

In step 710, a body of the Accumulate method of the contract is determined, where logic of a while loop of the cursor loop is included in the body of the Accumulate method. For example, custom aggregate function constructor 322 determines the body of the Accumulate function (e.g., if (!isInitialized) {«Assignments for Vinit»isInitialized=true; } «Loop body Δ» shown in Code Example 3). The definition of Accumulate( ) is formed by two blocks of code including field initializations and the loop body block. The set of fields $V_{init}$ that are initialized is given by Equation 4 (above). As described above, the Boolean field isInitialized denotes whether the fields of this aggregate class are initialized or not. The first time Accumulate( ) is invoked for a group, isInitialized may be false and hence the fields in $V_{init}$ are initialized. During subsequent invocations, this block is skipped as isInitialized would be true. Following the initialization block, loop body 116 is appended to the definition of Accumulate( ).

In step 712, a body and return type of the Terminate method of the contract are determined. For example, custom aggregate function constructor 322 determines the body and return type for the aggregate class (e.g., «TYPE(Vterm)» Terminate( ) {return «Vterm» of Code Example 3). The Terminate method returns a tuple of all the field variables ($V_F$) that are live at the end of the loop. The set of candidate variables $V_{term}$ are identified by performing a liveness analysis for the module (e.g., UDF or stored procedures 106, or application 120) comprising cursor 112. The return type of custom aggregate function 128 is a tuple where each attribute corresponds to a variable that is live at the end of the loop. The tuple datatype can be implemented using User-Defined Types in DBMS SQL server 102. For the loop in Code Example 1, $V_{term}$={suppName}, and for the loop in Code Example 2, $V_{term}$={cumulativeROI}. For simplicity, since these are single-attribute tuples, use of a tuple is avoided and the type of the attribute is used as the return type of Terminate( ).

Figure 8:
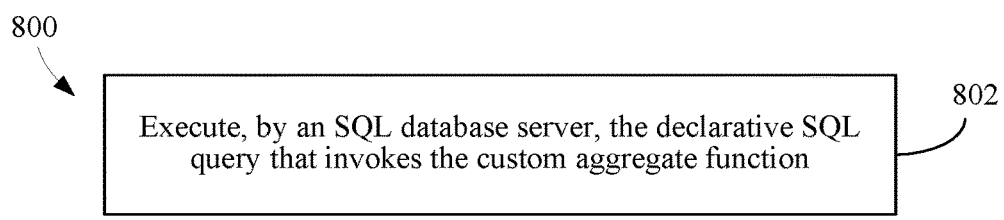
FIG. 8 is a flowchart of a method for executing a declarative SQL query that invokes a custom aggregate function, according to an example embodiment.

In embodiments, systems 100 and 300 may operate in various ways to perform their functions. For example, FIG. 8 is a flowchart 800 of a method for executing a declarative SQL query that invokes a custom aggregate function, according to an example embodiment. In one embodiment, flowchart 800 may be performed by query processing engine 110 of DBMS SQL server 102. For the purpose of illustration, flowchart 800 of FIG. 8 is described with reference to FIG. 1.

Flowchart 800 of FIG. 8 includes step 802. In step 802, an SQL database server executes a declarative SQL query that invokes a custom aggregate function. For example, query processor 110 of SQL database server 102 executes declarative SQL query with custom aggregate invocation 130. In this regard, Aggify processor 108 may receive cursor 112 including SQL query 114 and loop body 116 from either of client device 104 or DBBS SQL server 102, and convert the same to declarative SQL query with custom aggregate invocation 130. For example, Aggify processor 108 is configured to automatically construct custom aggregate function 128, which is equivalent or substantially the same in semantics to loop body 116 of cursor 112. Aggify processor 108 may rewrite SQL query 114 to generate declarative SQL query with custom aggregate invocation 130 that invokes the constructed custom aggregate function 128. Aggify processor 108 is further configured to forward declarative SQL query with custom aggregate invocation 130 to query processing engine 110.

Query processing engine 110 may receive declarative SQL query with custom aggregate invocation 130 from Aggify processor 108, process the declarative SQL query 130, retrieve data from storage engine 132, and process the results. Storage engine 132 may read stored data in response to a request from query processing engine 110 as a result of the processing of declarative SQL query with custom aggregate invocation 130, and transmit the read data to query processing engine 110. Query processing engine 110 may return the requested data to the component that originated cursor 112 (e.g., UDF or stored procedure 106 of DBMS SQL server 104, or application 120 of client device 102). Execution of the declarative SQL query that invokes the custom aggregate function 130 is pipelined by query processing engine 110 without materialization of intermediate results or data movement.

Executing declarative SQL query with custom aggregate invocation 130 in DBMS SQL server 102 as opposed to executing cursor 112, provides several performance benefits. For example, it avoids materialization of intermediate cursor 112 query results to disk. Instead, the entire loop of declarative SQL query with custom aggregate invocation 130 is executed as a single pipelined query operation. Moreover, with the Aggify technique, optimization methods of aggregate functions may be leveraged and result in efficient query plans. Where cursor loops are included in applications that run outside the DBMS (e.g., application 120), the Aggify technique can significantly reduce the amount of data transferred between DBMS SQL server 102 and a client device 104. Further, the entire cursor loop computation which would have originally run on client device 104 may now be run inside DBMS SQL server 102 by query processing engine 110, closer to the data read by storage engine 132. Finally, all these benefits are achieved without having to perform intrusive changes to user code.

6.3.1 Nested Cursor Loops

Cursors (e.g., cursor 112) can be nested, and Aggify processor 108 can handle such cases as well. This can be achieved by first running Aggify Technique 1, described above, on the inner cursor loop and transforming it into a SQL query. Subsequently, Aggify Technique 1 can be run on the outer loop.

7. Preserving Semantics

The following section considers the correctness of the transformation performed by the Aggify Technique described above, and describes how the semantics of the cursor loop (e.g., cursor 112) are preserved with this technique.

Let $CL(Q, \Delta)$ be a cursor loop (e.g., cursor loop 112), and let $Q'$ be the rewritten query that invokes the custom aggregate (e.g., declarative SQL query with custom aggregate 130). The program state comprises of values for all live variables at a particular program point. Let $P_0$ denote the program state at the beginning of the loop and $P_n$ denote the program state at the end of the loop, where $n=|Q|$. To verify correctness, it is shown that if the execution of the cursor loop on $P_0$ results in $P_n$, then the execution of $Q'$ on $P_0$ also results in $P_n$. In this discussion, only program state is considered, and not the database state, as the transformation only applies to loops that do not modify the database state. Every iteration of the loop can be modeled as a function that transforms the intermediate program state. Formally:

$$P_i = f(P_i - 1, T_i)$$

where i ranges from 1 to n. The function $f$ would be comprised of the operations in the loop body $\Delta$ (e.g., loop body 116). It is now straightforward to see that the Accumulate( ) method of custom aggregate function 128, constructed by Aggify processor 108, mimics this behavior. This is because (a) the statements in the loop body $\Delta$ (e.g., loop body 116) are directly placed in the Accumulate( ) method, (b) the Accumulate( ) method is called for every tuple in Q, and (c) the rule in Equation 6 may ensure that the order of invocation of Accumulate( ) is identical to that of the loop when necessary. The fields of the aggregate class and their initialization may ensure the inter-iteration program states are maintained. With respect to the fields of the aggregate class, consider that $V_F = P_0$. In other words, variables that are live at the beginning of the loop (i.e. $P_0$) are considered as fields of the aggregate. From the definition of $V_{term}$ in Section 5.4, it follows that $P_n = V_{term}$. Therefore the output of the custom aggregate may be identical to the program state at the end of the cursor loop.

8. Enhancements

The following enhancements for the Aggify technique serve to broaden its applicability.

8.1 Optimizing Iterative FOR Loops

Figure 9:
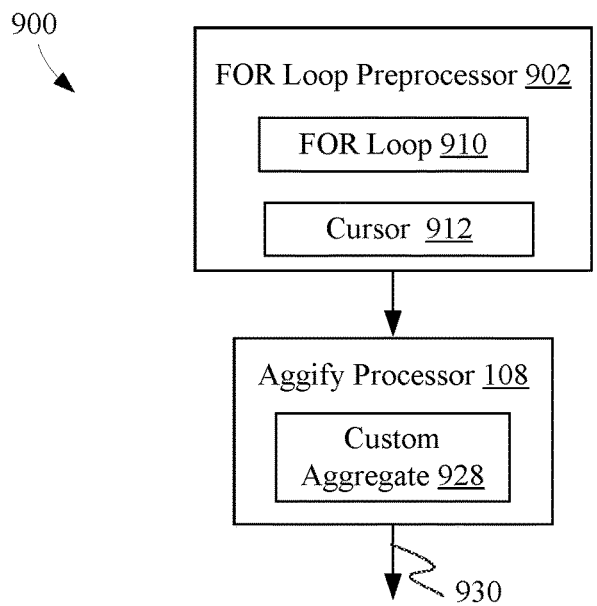
FIG. 9 is a block diagram of a system configured to convert a FOR loop to a declarative SQL query that invokes a custom aggregate function, according to an example embodiment.

Although the above description of the Aggify technique has focused on optimizing loops over query results, the technique can be extended to more general FOR loops with a fixed iteration space. For instance, FIG. 9 is a block diagram of a system 900 configured to convert a FOR loop to a declarative SQL query that invokes a custom aggregate function, according to an example embodiment.

System 900 includes a FOR loop preprocessor 902 and Aggify processor 108. FOR loop preprocessor 902 includes a FOR loop 910 and a cursor 912. Aggify processor includes a custom aggregate function 928. Also shown is declarative SQL query with custom aggregate invocation 930.

In general, a FOR loop is a control structure used to write a loop that executes a specific number of times. Such loops are often encountered in the field, and typically have the following structure:

FOR (init; condition; increment) { statement(s);}

Such loops can be written as cursor loops by expressing the iteration space as a relation. Consider the following example of FOR loop 910:

FOR (i=0; i<=100; i++) {statement(s);}

FOR loop preprocessor 902 is configured to write the iteration space of FOR loop 910 as a select query using recursive common table expressions (CTE) or vendor specific constructs (e.g., DUAL in Oracle).

FOR loop 910 may be rewritten as a select query using a recursive CTE according to a template as given below:

with CTE as (select 0 as I union all select i+1 from CTE where i<=100) select * from CTE In general, rewriting FOR loops as recursive CTE expressions can be achieved by extracting the init, condition, and increment expressions from the FOR loop, and placing them in the CTE template given above.

FOR loop preprocessor 902 is configured to then define cursor 912 on the above select query with the same loop body from FOR loop 910. Cursor 912 is now a standard cursor loop that can be processed by Aggify processor 108 (as described above with respect to cursor 112 and FIGS. 1-8).

FOR loop preprocessor 902 is configured to transmit cursor 910 to Aggify processor 108. Aggify processor 108 is configured to use the Aggify technique described above with respect to FIGS. 1-8 to construct custom aggregate 928 based on cursor 912, and rewrite custom aggregate 928 as declarative SQL query with custom aggregate invocation 930 for processing by query processing engine 110. Query processing engine 110 may retrieve data via storage engine 132 and process the retrieved data as needed, and return a result set of declarative SQL query with custom aggregate invocation 930 to the application that originated FOR loop 910.

Figure 10:
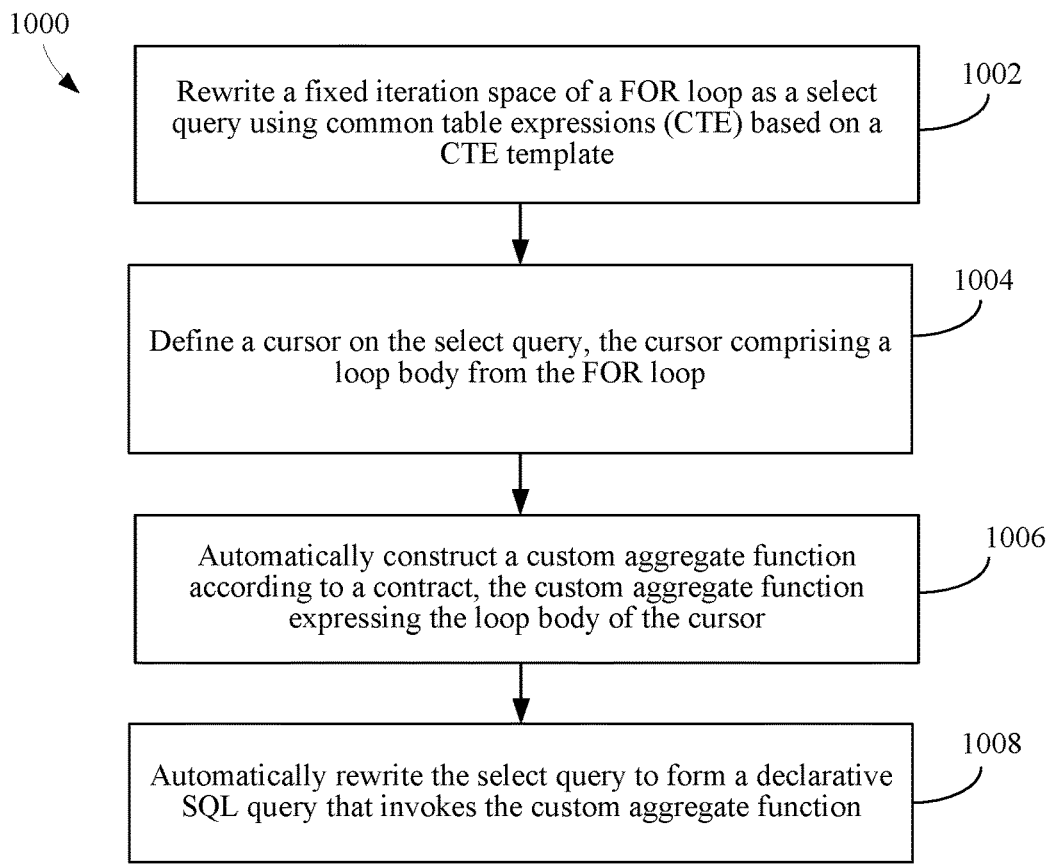
FIG. 10 is a flowchart of a method for converting a FOR loop to a declarative SQL query that invokes a custom aggregate function, according to an example embodiment.

In embodiments, system 900 may operate in various ways to perform its functions. For example, FIG. 10 is a flow chart 1000 of a method for converting a FOR loop to a declarative SQL query that invokes a custom aggregate function, according to an example embodiment. In one embodiment, flowchart 1000 may be performed by FOR loop processor 902 and Aggify processor 108. For the purpose of illustration, flowchart 1000 of FIG. 10 is described with reference to FIGS. 1, 3, 4 and 9.

Flowchart 1000 of FIG. 10 begins with step 1002. In step 1002, a fixed iteration space of a FOR loop is rewritten as a select query using common table expressions (CTE) based on a CTE template. For example, FOR loop preprocessor 902 rewrites a fixed iteration space of FOR loop 910 as the select query described above, using CTEs based on the CTE template described above.

In step 1004, a cursor is defined on the select query, the cursor comprising a loop body from the FOR loop. For example, FOR loop preprocessor 902 defines cursor 912 on the select query described above where cursor 912 includes a loop body from FOR loop 910.

In step 1006, a custom aggregate function is automatically constructed according to a contract, the custom aggregate function expressing the loop body of the cursor. For example, Aggify processor 108 automatically constructs custom aggregate function 928 according to a contract as described above for custom aggregate function 128 with respect to FIGS. 1-8. Custom aggregate function 928 expresses the loop body of cursor 912, which originated from FOR loop 910.

In step 1008, the select query is automatically rewritten to form a declarative SQL query that invokes the custom aggregate function. For example, Aggify processor 108 automatically rewrites the select query that was generated based on the CTE template, to form declarative SQL query with custom aggregate invocation 930. Declarative SQL query with custom aggregate invocation 930 may then be transmitted to query process 110 for processing (as described above with respect to processing of declarative SQL query with custom aggregate invocation 130) and to return a result set to the application that originated FOR loop 910.

8.2 Extending Existing Techniques

The Aggify technique can seamlessly integrate with other types of optimization techniques, both in the case of applications that run outside a DBMS SQL server and UDFs that run within the server. For example, the Aggify technique can be used as a preprocessing step applied to other techniques that use programming languages for optimizing database applications. For example, the Aggify technique can be used as a preprocessing step to replace loops with equivalent queries which invoke a custom aggregate. Then, the techniques from programming languages for optimizing the database applications can be used to further optimize the program.

The Microsoft® Froid framework is involved with transforming UDFs into subqueries that can then be optimized. However, Froid cannot optimize UDFs with loops. For the case of cursor loops, the Aggify technique may be used to transform the loops while avoiding the creation of recursive CTEs.

These ideas can be used together in the following manner: (i) if the function has a cursor loop, use the Aggify technique to eliminate it. (ii) if the function has a FOR loop and the necessary expressions can be extracted from it, use the technique described in Section 8.1 along with the Aggify technique to eliminate the loop.

9. Implementation

The Aggify technique described herein can be implemented either inside a DBMS or as an external tool. As an example, a version of the Aggify technique has been implemented in a Microsoft® SQL Server. This version of Aggify technique supports cursor loops that are written in Transact-SQL, and constructs a user-defined aggregate in C#. Note that translating from T-SQL into C# might lead to loss of precision and sometimes different results due to a difference in data type semantics. Another approach is to natively implement this inside a database engine.

Implementing the Aggify technique inside a DBMS may enable the construction of more efficient implementations of custom-aggregates that can be baked into the DBMS itself. Also, observe that the rule in Equation 6 that enforces streaming the aggregate operator for the custom aggregate, is considered part of the query optimizer. In fact, apart from this rule, no other change is indicated for the query optimizer. Other parts of the Aggify technique may be implemented outside the query optimizer. However, since Microsoft® SQL Server only supports the Streaming Aggregate operator for user-defined aggregates, it was unnecessary to implement Equation 6.

Microsoft® Froid is available as a feature called Scalar UDF Inlining in Microsoft® SQL Server 2019. As mentioned above, the Aggify technique may integrate seamlessly with Froid, thereby extending the scope of Froid to also handle UDFs with cursor loops. The Aggify technique would first be used to replace cursor loops with equivalent SQL queries having a custom aggregate, this is then followed by Froid which can now inline the UDF.

10. Resource Savings

In addition to performance gains described above, use of the Aggify technique (performed by Aggify processor 108) also reduces resource consumption, for example, disk I/O. This is because cursors (e.g., cursor 112) materialize query results to disk, and then read from the disk during iteration. In contrast, with the application of the Aggify technique, the entire loop runs in a pipelined manner (e.g., in query processor 110). It has been shown that the Aggify technique significantly reduces the required number of reads. Furthermore, one of the key benefits of using the Aggify technique is the reduction in data movement from a remote DBMS (e.g., DBMS SQL server 102) to client applications (e.g., of client device 104).

11. Conclusion

Although it is well-known that set-oriented operations are generally more efficient compared to row-by-row operations, there are several scenarios where cursor loops are preferred, or are even inevitable. However, due to many reasons described above, cursor loops can not only result in poor performance, but also affect concurrency and resource consumption. The Aggify technique described herein addresses these problems by automatically replacing cursor loops with SQL queries that invoke custom aggregates that are automatically constructed based on the loop body. The Aggify technique can positively impact real-world workloads both in database-backed applications as well as UDFs and stored procedures.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry. As noted herein, the embodiments described, including but not limited to, system 100 of FIG. 1, system 300 of FIG. 3, and system 900 of FIG.

9 along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 11:
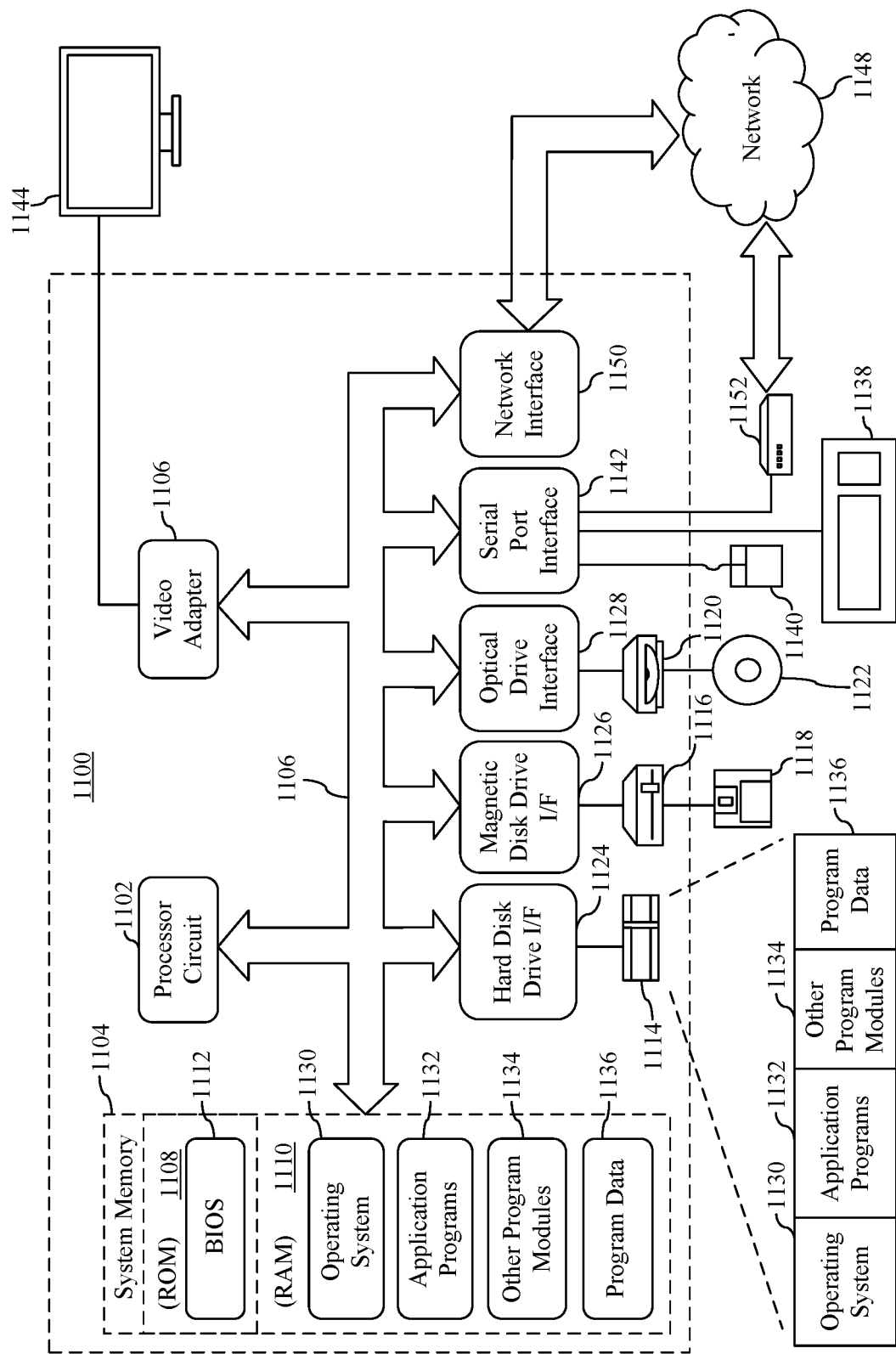
FIG. 11 is a block diagram of an example processor-based computer system that may be used to implement various embodiments.

FIG. 11 is a block diagram of an example processor-based computer system 1100 that may be used to implement various embodiments. DBMS SQL server 102 and client device 104 may each include any type of computing device, mobile or stationary, such as a desktop computer, a server, a video game console, etc. For example, any of DBMS SQL server 102 and client device 104 may be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc.

DBMS SQL server 102 and client device 104 may each be implemented in one or more computing devices containing features similar to those of computing device 1100 in stationary or mobile computer embodiments and/or alternative features. The description of computing device 1100 provided herein is provided for purposes of illustration, and is not intended to be limiting. Embodiments may be implemented in further types of computer systems, as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random-access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing DBMS SQL server 102, client device 104, UDF or stored procedure 106, cursor 112, SQL query 114, loop body 116, Aggify processor 108, custom aggregate function 128, query processing engine 110, storage engine 132, application 120, user interface 124, declarative SQL query with custom aggregate invocation 130, parser 310, algebrizer 312, precondition verifier 320, custom aggregate function constructor 322, query rewrite engine 324, static analysis engine 330, CFG 400, FOR loop preprocessor 902, FOR loop 910, cursor 912, custom aggregate function 928, declarative SQL query with custom aggregate invocation 930, flowchart 200, flowchart 500, flowchart 600, flowchart 700, flowchart 800, flow chart 1000, and/or further embodiments described herein. Program data 1136 may include custom aggregate function 128, declarative SQL query with custom aggregate invocation 130, custom aggregate function 928, declarative SQL query with custom aggregate invocation 930, and/or further embodiments described herein.

A user may enter commands and information into computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of computing device 1100.

Embodiments are also directed to computer custom aggregate function 128 program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a system for converting a loop to a declarative structure query language (SQL) query that invokes a custom aggregate function is described herein. The system comprises one or more processors and one or more memory devices that store program code to be executed by the one or more processors. The program code comprises a precondition verifier configured to receive the loop for execution. The loop comprises a select query and a loop body including a program fragment that can be evaluated over a result set of the select query one row at a time. The a precondition verifier is also configured to verify that the loop body does not modify a persistent state of the database. A custom aggregate function constructor is configured to automatically construct the custom aggregate function according to a contract, the custom aggregate function expressing the loop body. A query rewrite engine is configured to automatically rewrite the select query to the declarative SQL query that invokes the custom aggregate function.

In an embodiment of the foregoing system, the custom aggregate function constructor is configured to automatically construct the custom aggregate function during compile time according to methods of the contract. The methods of the contract comprise at least one of an Init method, an Accumulate method, a Terminate method, and a Merge method.

In an embodiment of the foregoing system, the custom aggregate function constructor comprises a static analysis engine configured to perform static analysis on the loop body. The custom aggregate function constructor is further configured to utilize results of the static analysis to automatically construct an aggregate class of the custom aggregate function, the aggregate class comprising the at least one method of the contract. The custom aggregate function constructor is further configured to generate code fragments for the at least one method of the contract in the aggregate class and generate code fragments of fields of the aggregate class.

In an embodiment of the foregoing system, the custom aggregate function constructor is configured to automatically construct an aggregate class comprising methods of the contract of the custom aggregate function by determining: fields of the aggregate class, a body of an Init method of the contract, parameters of an Accumulate method of the contract, a body of the Accumulate method of the contract, wherein logic of a while loop of the cursor loop is included in the body of the Accumulate method, and a body and return type of a Terminate method of the contract.

In an embodiment of the foregoing system, the declarative SQL query comprises a FROM clause comprising a subquery with preserved semantics of the select query, and a SELECT clause that includes the invoking of the custom aggregate function.

In an embodiment of the foregoing system, the declarative SQL query invokes the custom aggregate function on each tuple of the of a result set of the select query.

In an embodiment of the foregoing system: the declarative SQL query includes an order by clause, sort operations of the declarative SQL query are performed before the custom aggregate function is invoked, and a streaming aggregate physical operator implements the custom aggregate function.

In an embodiment of the foregoing system, the system further comprises an SQL database server configured to execute the declarative SQL query that invokes the custom aggregate function. In further accordance with such an embodiment, the SQL database server is configured to execute the declarative SQL query that invokes the custom aggregate function in a pipelined manner without intermediate materialization or data movement.

In an embodiment, a method for converting a loop to a declarative SQL query that invokes a custom aggregate function. The method comprises receiving the loop for execution. The loop comprises a select query and a loop body including a program fragment that can be evaluated over a result set of the select query one row at a time. The method further comprises automatically constructing the custom aggregate function according to a contract, the custom aggregate function expressing the loop body, and automatically rewriting the select query to the declarative SQL query that invokes the custom aggregate function.

In an embodiment of the foregoing method, the method further comprises verifying that the loop body does not modify a persistent state of the database prior to automatically constructing of the custom aggregate function.

In an embodiment of the foregoing method, where automatically constructing the custom aggregate function comprises automatically constructing the custom aggregate function during compile time according to methods of the contract. The methods of the contract comprise at least one of: an Init method, an Accumulate method, a Terminate method, and a Merge method.

In an embodiment of the foregoing method, the method further comprises performing static analysis on the loop body, utilizing results of the static analysis to automatically construct an aggregate class of the custom aggregate function where the aggregate class comprises the at least one method of the contract, generating code fragments for the at least one method of the contract in the aggregate class, and generating code fragments of fields of the aggregate class.

In an embodiment of the foregoing method, the method further comprises automatically constructing an aggregate class comprising methods of the contract of the custom aggregate function by determining: fields of the aggregate class, a body of an Init method of the contract, parameters of an Accumulate method of the contract, a body of the Accumulate method of the contract, where logic of a while loop of the cursor loop is included in the body of the Accumulate method, and a body and return type of a Terminate method of the contract.

In an embodiment of the foregoing method, the declarative SQL query comprises a FROM clause comprising a subquery with preserved semantics of the select query, and a SELECT clause that includes the invoking of the custom aggregate function.

In an embodiment of the foregoing method, the declarative SQL query invokes the custom aggregate function on each tuple of the of a result set of the select query.

In an embodiment of the foregoing method: the declarative SQL query includes an order by clause, sort operations of the declarative SQL query are performed before the custom aggregate function is invoked, and a streaming aggregate physical operator implements the custom aggregate function.

In an embodiment of the foregoing method, the method further comprises executing, by an SQL database server, the declarative SQL query that invokes the custom aggregate function. In further accordance with such an embodiment, executing the declarative SQL query that invokes the custom aggregate function comprises executing the declarative SQL query that invokes the custom aggregate function in a pipelined manner without intermediate materialization or data movement.

In an embodiment, a method for converting a FOR loop comprising a fixed iteration space to a declarative SQL query that invokes a custom aggregate function comprises rewriting the fixed iteration space of the FOR loop as a select query using common table expressions (CTE) based on a CTE template. The method further comprises defining a cursor on the select query, where the cursor comprises a loop body from the FOR loop. The method further comprises automatically constructing the custom aggregate function according to a contract, the custom aggregate function expressing the loop body of the cursor, and automatically rewriting the select query to form the declarative SQL query that invokes the custom aggregate function.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A system for converting a loop to a declarative structure query language (SQL) query that invokes a custom aggregate function, the system comprising:
   one or more processors; and
   one or more memory devices that store program code to be executed by the one or more processors, the program code comprising:
      a precondition verifier configured to:
         receive the loop for execution, the loop comprising a select query and a loop body including a program fragment that can be evaluated over a result set that is returned in response to the execution of the select query one row at a time;
         verify that the loop body does not include operations that modify a persistent state of the database;
      a custom aggregate function constructor configured to:
         automatically construct the custom aggregate function according to a contract, the custom aggregate function expressing the loop body;
      a query rewrite engine configured to:
         automatically rewrite the select query to the declarative SQL query that invokes the custom aggregate function.

2. The system of claim 1, wherein the custom aggregate function constructor is configured to automatically construct the custom aggregate function during compile time according to methods of the contract, the methods of the contract comprising at least:
   an init method;
   an accumulate method; and
   a terminate method.

3. The system of claim 2, wherein:
   the custom aggregate function constructor comprises a static analysis engine configured to perform static analysis on the loop body; and
   the custom aggregate function constructor is further configured to:
      utilize results of the static analysis to automatically construct an aggregate class of the custom aggregate function, the aggregate class comprising the methods of the contract;
      generate code fragments for the methods of the contract in the aggregate class; and
      generate code fragments of fields of the aggregate class.

4. The system of claim 1, wherein the custom aggregate function constructor is configured to automatically construct an aggregate class comprising methods of the contract of the custom aggregate function by determining:
fields of the aggregate class;
a body of an init method of the contract;
parameters of an accumulate method of the contract;
a body of the accumulate method of the contract, wherein logic of a while loop of the cursor loop is included in the body of the accumulate method; and
a body and return type of a terminate method of the contract.

5. The system of claim 1, wherein the declarative SQL query comprises:
a from clause comprising a subquery with preserved semantics of the select query; and
a select clause that includes the invoking of the custom aggregate function.

6. The system of claim 1, wherein the declarative SQL query invokes the custom aggregate function on each tuple of the of a result set of the select query.

7. The system of claim 1, wherein:
the declarative SQL query includes an order by clause;
sort operations of the declarative SQL query are performed before the custom aggregate function is invoked; and
a streaming aggregate physical operator implements the custom aggregate function.

8. The system of claim 1, further comprising an SQL database server configured to execute the declarative SQL query that invokes the custom aggregate function.

9. The system of claim 8, wherein the SQL database server is configured to execute the declarative SQL query that invokes the custom aggregate function in a pipelined manner without intermediate materialization or data movement.

10. A method for converting a loop to a declarative structure query language (SQL) query that invokes a custom aggregate function, the method comprising:
receiving the loop for execution, the loop comprising a select query and a loop body including a program fragment that can be evaluated over a result set that is returned in response to the execution of the select query one row at a time;
automatically constructing the custom aggregate function according to a contract, the custom aggregate function expressing the loop body; and
automatically rewriting the select query to the declarative SQL query that invokes the custom aggregate function.

11. The method of claim 10, further comprising verifying that the loop body does not include operations that modify a persistent state of the database prior to automatically constructing of the custom aggregate function.

12. The method of claim 10, wherein automatically constructing the custom aggregate function comprises automatically constructing the custom aggregate function during compile time according to methods of the contract, wherein the methods of the contract comprise at least:
an init method;
an accumulate method; and
a terminate method.

13. The method of claim 12, further comprising:
performing static analysis on the loop body;
utilizing results of the static analysis to automatically construct an aggregate class of the custom aggregate function, the aggregate class comprising the methods of the contract;
generating code fragments for the at least one method of the contract in the aggregate class; and
generating code fragments of fields of the aggregate class.

14. The method of claim 10, further comprising:
automatically constructing an aggregate class comprising methods of the contract of the custom aggregate function by determining:
fields of the aggregate class;
a body of an init method of the contract;
parameters of an accumulate method of the contract;
a body of the accumulate method of the contract, wherein logic of a while loop of the cursor loop is included in the body of the accumulate method; and
a body and return type of a terminate method of the contract.

15. The method of claim 10, wherein the declarative SQL query comprises:
a from clause comprising a subquery with preserved semantics of the select query; and
a select clause that includes the invoking of the custom aggregate function.

16. The method of claim 10, wherein the declarative SQL query invokes the custom aggregate function on each tuple of the result set of the select query.

17. The method of claim 10, wherein:
the declarative SQL query includes an order by clause;
sort operations of the declarative SQL query are performed before the custom aggregate function is invoked; and
a streaming aggregate physical operator implements the custom aggregate function.

18. The method of claim 10, further comprising executing, by an SQL database server, the declarative SQL query that invokes the custom aggregate function.

19. The method of claim 18, wherein executing the declarative SQL query that invokes the custom aggregate function comprises executing the declarative SQL query that invokes the custom aggregate function in a pipelined manner without intermediate materialization or data movement.

20. A method for converting a FOR loop comprising a fixed iteration space to a declarative structured query language (SQL) query that invokes a custom aggregate function, the method comprising:
rewriting the fixed iteration space of the FOR loop as a select query using common table expressions (CTE) based on a CTE template;
defining a cursor on the select query, the cursor comprising a loop body from the FOR loop;
automatically constructing the custom aggregate function according to a contract, the custom aggregate function expressing the loop body of the cursor; and
automatically rewriting the select query to form the declarative SQL query that invokes the custom aggregate function.

* * * * *